(12) United States Patent
Minato

(10) Patent No.: US 8,037,521 B2
(45) Date of Patent: Oct. 11, 2011

(54) INFORMATION PROCESSING APPARATUS ALLOWING MULTIPLE LOGINS

(75) Inventor: Junichi Minato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1273 days.

(21) Appl. No.: 11/098,502

(22) Filed: Apr. 5, 2005

(65) Prior Publication Data

US 2005/0231760 A1    Oct. 20, 2005

(30) Foreign Application Priority Data

Apr. 9, 2004   (JP) .................................. 2004-115836

(51) Int. Cl.
*G06F 21/22*   (2006.01)
(52) U.S. Cl. .................. 726/16; 726/17; 726/27; 726/28
(58) Field of Classification Search .......... 715/716–721, 715/736–737, 741–742, 859, 789; 713/161, 713/168; 726/28–29, 21
See application file for complete search history.

(56) References Cited

U.S. PATENT DOCUMENTS

| | | | |
|---|---|---|---|
| 5,923,842 A * | 7/1999 | Pedersen et al. | 726/8 |
| 7,418,702 B2 * | 8/2008 | Tsao | 718/1 |
| 2002/0027675 A1 | 3/2002 | Minato | |
| 2002/0038333 A1 * | 3/2002 | Evans et al. | 709/107 |
| 2002/0054139 A1 * | 5/2002 | Corboy et al. | 345/804 |
| 2003/0071840 A1 * | 4/2003 | Huang et al. | 345/736 |
| 2003/0079028 A1 * | 4/2003 | Kortum et al. | 709/229 |
| 2003/0110266 A1 * | 6/2003 | Rollins et al. | 709/227 |
| 2004/0260753 A1 * | 12/2004 | Regan | 709/200 |

FOREIGN PATENT DOCUMENTS

| | | |
|---|---|---|
| JP | 07-219873 | 8/1995 |
| JP | 7-319646 | 12/1995 |
| JP | 9-130532 | 5/1997 |
| JP | 9-171551 | 6/1997 |
| JP | 9-312717 | 12/1997 |
| JP | 10-31393 | 2/1998 |
| JP | 10-271270 | 10/1998 |
| JP | 11-146173 | 5/1999 |
| JP | 11-331472 | 11/1999 |
| JP | 2000-32184 | 1/2000 |
| JP | 2000-232566 | 8/2000 |

(Continued)

OTHER PUBLICATIONS

Tjahjono, Danu. "Building Software review Systems Using CSRS."Tech. Rep. ICS-TR-95-06. Univ of hawai, Honolulu, 1995.*

*Primary Examiner* — Minh Dinh
*Assistant Examiner* — Venkat Perungavoor
(74) *Attorney, Agent, or Firm* — Oblon, Spivak, McClelland, Maier & Neustadt, L.L.P.

(57) ABSTRACT

An information processing apparatus accepts operating instruction only from a user who has logged into the information processing apparatus, and is assigned with a screen of the information processing apparatus. The information processing apparatus includes a login processing unit configured to allow a first user to login and be assigned with the screen and to allow a second user, after the first user, to login and be assigned with the screen by reassigning the screen from the first user to the second user while maintaining a login status of the first user.

9 Claims, 30 Drawing Sheets

FOREIGN PATENT DOCUMENTS

| | | |
|---|---|---|
| JP | 2000-261585 | 9/2000 |
| JP | 2001-28657 | 1/2001 |
| JP | 2001-202208 | 7/2001 |
| JP | 2001-333233 | 11/2001 |
| JP | 2002-27189 | 1/2002 |
| JP | 2002-82806 | 3/2002 |
| JP | 2002-84383 | 3/2002 |
| JP | 3356573 | 10/2002 |
| JP | 3383725 | 12/2002 |
| JP | 2003-229979 | 8/2003 |
| JP | 2003-274125 | 9/2003 |
| JP | 2004-56715 | 2/2004 |
| JP | 2004-112303 | 4/2004 |
| JP | 2004-135300 | 4/2004 |

\* cited by examiner

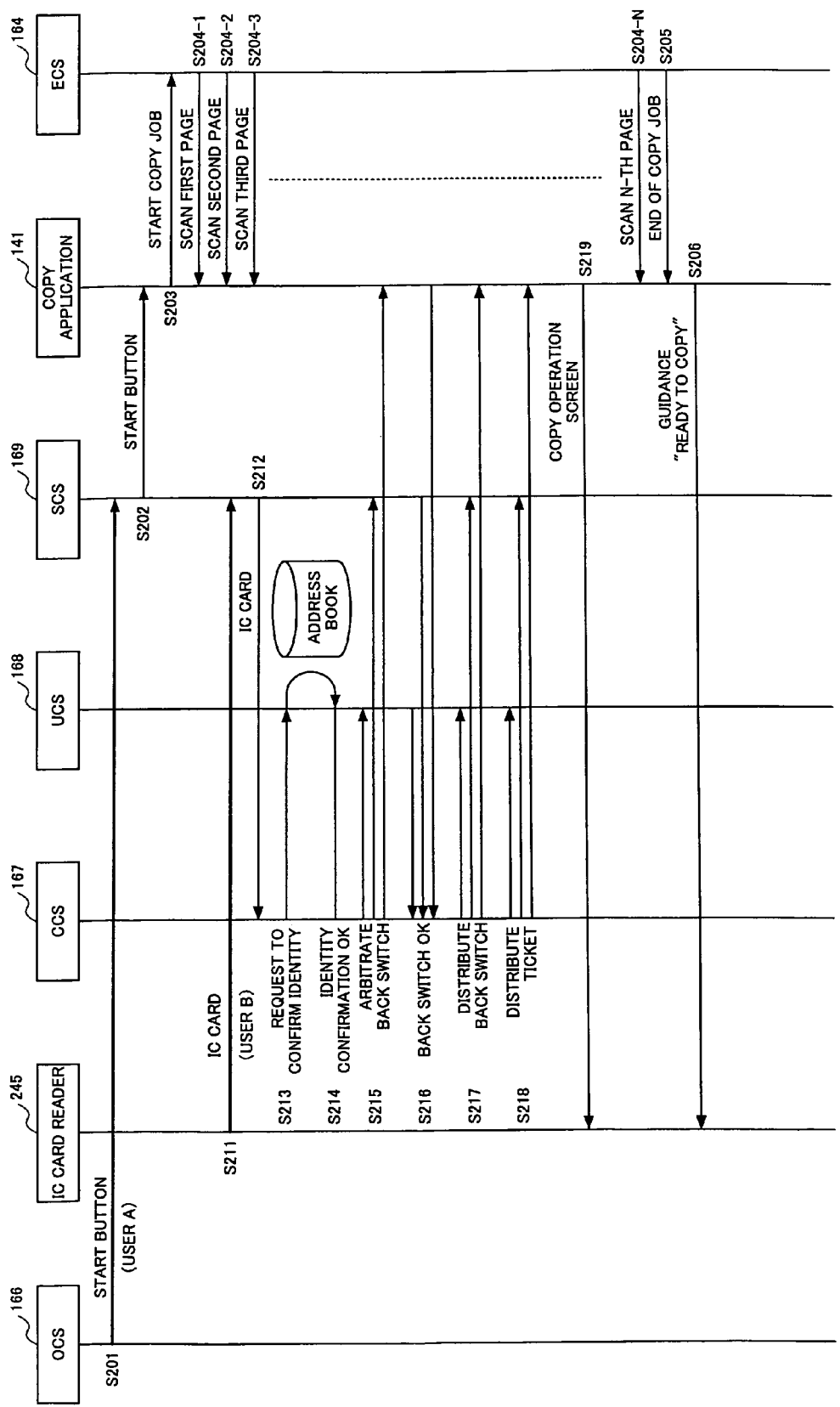

FIG.9A

| LOGIN USER: USER A | | | |
|---|---|---|---|
| 600dpi<br>A4<br>LETTER (FOR PRINTING)<br>AUTOMATIC DENSITY ADJUSTMENT<br>□□▨▨■<br>SCAN CONDITION<br>SIMPLEX PRINTING / DUPLEX PRINTING<br>LARGE DOCUMENT<br>FEED DOCUMENT | SCANNING IN PROGRESS     CANCEL SCANNING<br>REMAINING MEMORY; 100%<br>ORIGINAL COPY: 2    [00030]   To: morikawa@nts.r.co.jp   HIROSHI MORIKAWA<br>[00031]   To: shinohara@nts.r.co.jp   MICHINARI SHINOHARA<br>[00032]   To: saeki@nts.r.co.jp   KAORI SAEKI<br>[00033]   To: nomura@nts.r.co.jp   KANAE NOMURA<br>[00034]   To: kinoshita@nts.r.co.jp   TOKIKO KINOSHITA | TRANSMITTED TO: SIX ITEMS<br>1/2<br>PREVIOUS<br>NEXT | UE PROMOTION OFFICE<br>SENDER NAME<br>SUBJECT/ BODY TEXT<br>MULTI-PAGE: TIFF/JPEG<br>FILE<br>SELECT STORED DOCUMENT<br>STORE + TRANSMIT<br>STORE DOCUMENT |

FIG.9B

| LOGIN USER: USER A | | | |
|---|---|---|---|
| 600dpi<br>A4<br>LETTER (FOR PRINTING)<br>AUTOMATIC DENSITY ADJUSTMENT<br>□□▨▨■<br>SCAN CONDITION<br>SIMPLEX PRINTING / DUPLEX PRINTING<br>FEED DOCUMENT | SCANNING IN PROGRESS    CANCEL SCANNING<br>REMAINING MEMORY; 100%<br><br>LOGON<br>ENTER USER NAME AND PASSWORD, THEN PRESS "OK"<br>▶ USER NAME   [USER B]   ENTER   CLEAR<br>▶ PASSWORD   [********]   ENTER   CLEAR<br>                  OK | | UE PROMOTION OFFICE<br>SENDER NAME<br>SUBJECT/ BODY TEXT<br>MULTI-PAGE: TIFF/JPEG<br>FILE<br>SELECT STORED DOCUMENT<br>STORE DOCUMENT |

FIG.9C

| LOGIN USER: USER B | | | |
|---|---|---|---|
| 600dpi<br>A4<br>LETTER (FOR PRINTING)<br>AUTOMATIC DENSITY ADJUSTMENT<br>□□▨▨■<br>SCAN CONDITION<br>SIMPLEX PRINTING / DUPLEX PRINTING<br>FEED DOCUMENT | TRANSMISSION REPORT/CANCEL<br>REMAINING MEMORY; 100%<br>NUMBER OF ITEMS: 0<br>To / Cc / Bcc / SELECT REGISTRATION NUMBER / DIRECT INPUT<br>NORMAL USE / A / B / C / D / E / F / G / H / I / J<br>[00001] P&S PC / [00002] CF2 6 DESIGN / [00003] PRODUCT PLANNING / [00004] IDG / [00005] P&S PM / [00006] CF2 7 DESIGN<br>[00007] PROG G / [00008] JCL / [00009] COMM G / [000010] SALES PROMOTION / [000011] OVERSEE PROMOTION / [000012] SOFTWARE CCG | 1/3000<br>△<br>▽ | UE PROMOTION OFFICE<br>SENDER NAME<br>SUBJECT/ BODY TEXT<br>MULTI-PAGE: TIFF/JPEG<br>FILE<br>SELECT STORED DOCUMENT<br>STORE + TRANSMIT<br>STORE DOCUMENT |

FIG.9D

| | USER NAME | DOCUMENT NAME | DATE | PAGE | ORDER OF TRANSMISSION |
|---|---|---|---|---|---|
| | MORIKAWA | 00001 | 12/12 | 15 | 1 |
| | YANO | KARAOKE | 12/13 | 15 | |
| 1 | TAKATSU | MAP FOR PARTY | 12/14 | 15 | 2 |
| | KINOSITA | FLOW | 12/15 | 15 | |

LOGIN USER: USER B
SELECT STORED DOCUMENT  SELECT DOCUMENT FOR TRANSMISSION, THEN PRESS "OK"

SELECT DOCUMENT | DETAIL
SELECT ALL
SEARCH BY USER NAME
SEARCH BY DOCUMENT NAME
TRANSMIT STORED DOCUMENT | MANAGE/ERASE STORED DOCUMENT

TOTAL SIZE: 550000000KB
1/4
PREVIOUS / NEXT
CANCEL | O K

FIG.9E

LOGIN USER: USER B

TRANSMISSION IN PROGRESS — TRANSMISSION REPORT/CANCEL
REMAINING MEMORY: 100%

- To: morikawa@nts.r.co.jp [00030] HIROSHI MORIKAWA
- To: shinohara@nts.r.co.jp [00031] MICHINARI SHINOHARA
- To: saeki@nts.r.co.jp [00032] KAORI SAEKI
- To: nomura@nts.r.co.jp [00033] KANAE NOMURA
- To: kinoshita@nts.r.co.jp [00034] TOKIKO KINOSHITA

TRANSMITTED TO: SIX ITEMS
1/2
PREVIOUS / NEXT

SCAN CONDITION
SIMPLEX PRINTING | DUPLEX PRINTING
LARGE DOCUMENT
FEED DOCUMENT

SENDER NAME
SUBJECT/BODY TEXT
MULTI-PAGE: TIFF/JPEG
FILE
2 DOCUMENT
SELECT STORED DOCUMENT
STORE DOCUMENT

FIG.9F

600dpi A4
LETTER (FOR PRINTING)
AUTOMATIC DENSITY ADJUSTMENT
SCAN CONDITION
SIMPLEX PRINTING | DUPLEX PRINTING
LARGE DOCUMENT
FEED DOCUMENT

CANCEL SCANNING
REMAINING MEMORY: 100%

LOGON
ENTER USER NAME AND PASSWORD, THEN PRESS "OK"

▶ USER NAME [ USER A ] ENTER | CLEAR
▶ PASSWORD [ ******** ] ENTER | CLEAR
OK

UE PROMOTION OFFICE
SENDER NAME
SUBJECT/BODY TEXT
MULTI-PAGE: TIFF/JPEG
FILE
SELECT STORED DOCUMENT
STORE + TRANSMIT
STORE DOCUMENT

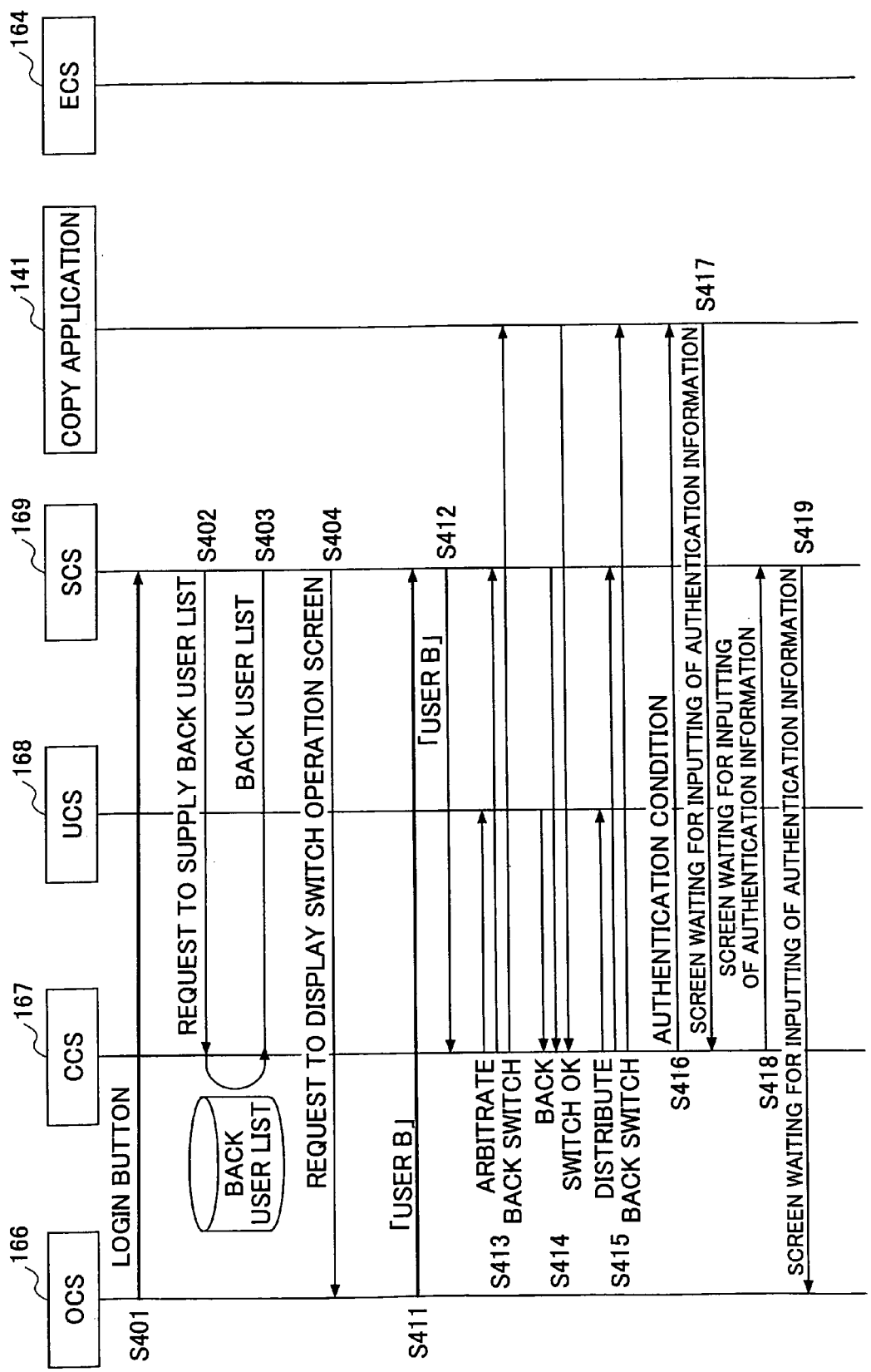

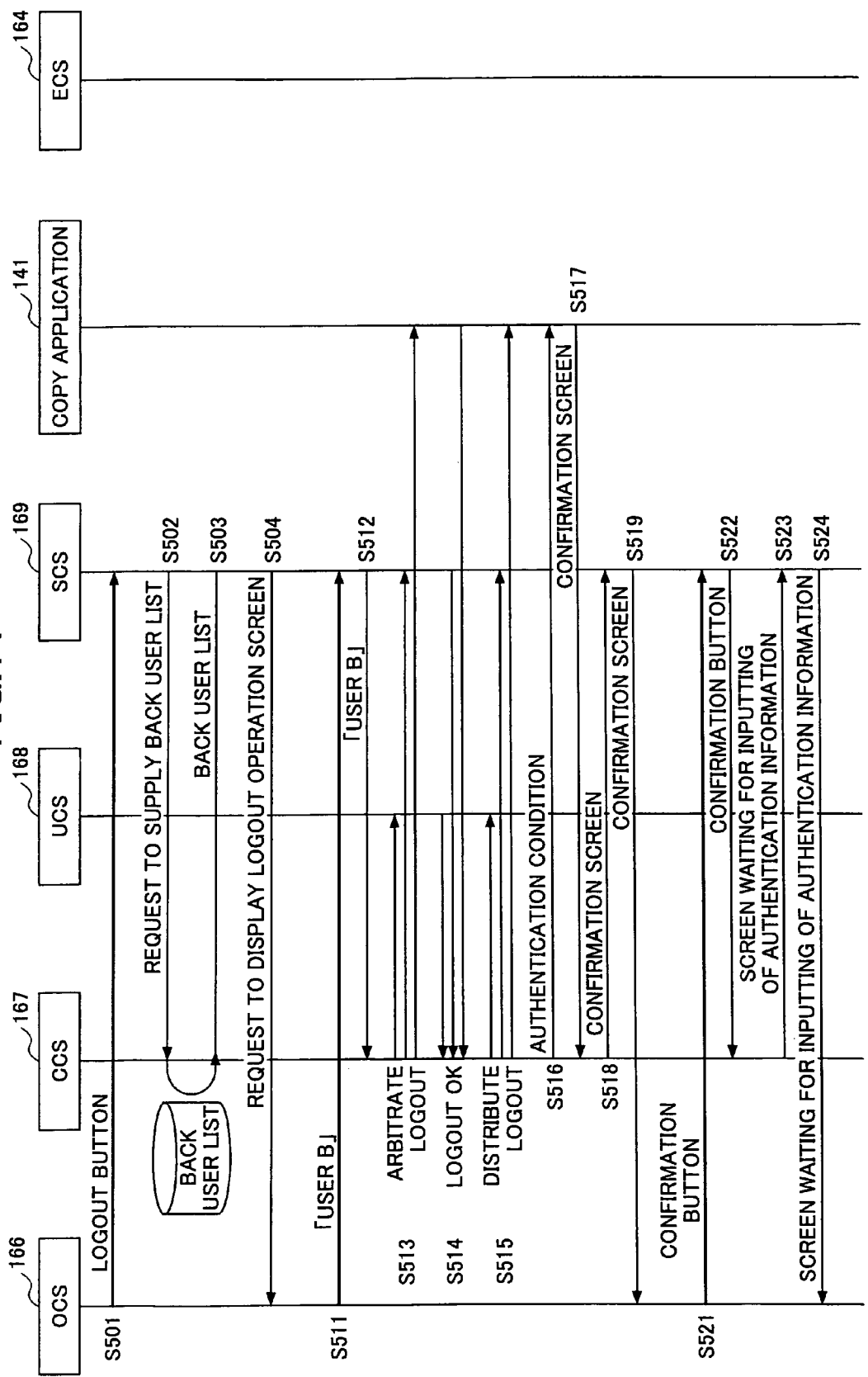

FIG.16A

LOGIN USER: USER A

SWITCH FRONT USER

[00001] USER A

[00007] USER B

[00020] USER C

NEW

CANCEL  SELECT

FIG.16B

LOGIN USER: USER B

SWITCH FRONT USER

[00001] USER A

[00007] USER B

NEW

CANCEL  SELECT

FIG.17D

| ERROR IN BACKGROUND JOB.: USER B | | | |
|---|---|---|---|
| 600dpi A4 LETTER (FOR PRINTING) AUTOMATIC DENSITY ADJUSTMENT □□▨▧▨■ SCAN CONDITION SIMPLEX PRINTING / DUPLEX PRINTING FEED DOCUMENT | TRANSMISSION IN PROGRESS —— TRANSMISSION REPORT/CANCEL REMAINING MEMORY: 100% ✉ To: morikawa@nts.r.co.jp [00030] HIROSHI MORIKAWA ✉ To: shinohara@nts.r.co.jp [00031] MICHINARI SHINOHARA ✉ To: saeki@nts.r.co.jp [00032] KAORI SAEKI ✉ To: nomura@nts.r.co.jp [00033] KANAE NOMURA ✉ To: kinoshita@nts.r.co.jp [00034] TOKIKO KINOSHITA | TRANSMITTED TO: SIX ITEMS 1/2 △ PREVIOUS ▼ NEXT | SENDER NAME SUBJECT/ BODY TEXT MULTI-PAGE: TIFF FILE SELECT STORED DOCUMENT STORE + TRANSMIT STORE DOCUMENT |

FIG.17E

| ERROR IN BACKGROUND JOB. RELEVANT PERSONNEL ALREADY NOTIFIED. | | | |
|---|---|---|---|
| SCAN CONDITION SIMPLEX PRINTING / DUPLEX PRINTING FEED DOCUMENT | TRANSMISSION IN PROGRESS —— TRANSMISSION REPORT/CANCEL REMAINING MEMORY: 100% ✉ To: morikawa@nts.r.co.jp [00030] HIROSHI MORIKAWA ✉ To: shinohara@nts.r.co.jp [00031] MICHINARI SHINOHARA ✉ To: saeki@nts.r.co.jp [00032] KAORI SAEKI ✉ To: nomura@nts.r.co.jp [00033] KANAE NOMURA ✉ To: kinoshita@nts.r.co.jp [00034] TOKIKO KINOSHITA | TRANSMITTED TO: SIX ITEMS 1/2 △ PREVIOUS ▼ NEXT | SENDER NAME SUBJECT/ BODY TEXT MULTI-PAGE: TIFF FILE 2 DOCUMENT SELECT STORED DOCUMENT STORE DOCUMENT |

FIG.17F

| LOGIN USER: USER A | | |
|---|---|---|
| REPORT ERROR | | |
| ▶ REPORT ERROR F1 | YES | NO |
| ▶ REPORT ERROR ON OTHER USER'S SCREEN F2 | YES | NO |
| ▶ REPORT BY EMAIL F3 | YES | NO |
| ▶ REPORT BY ALARM LAMP F4 | YES | NO |
| | CANCEL | OK |

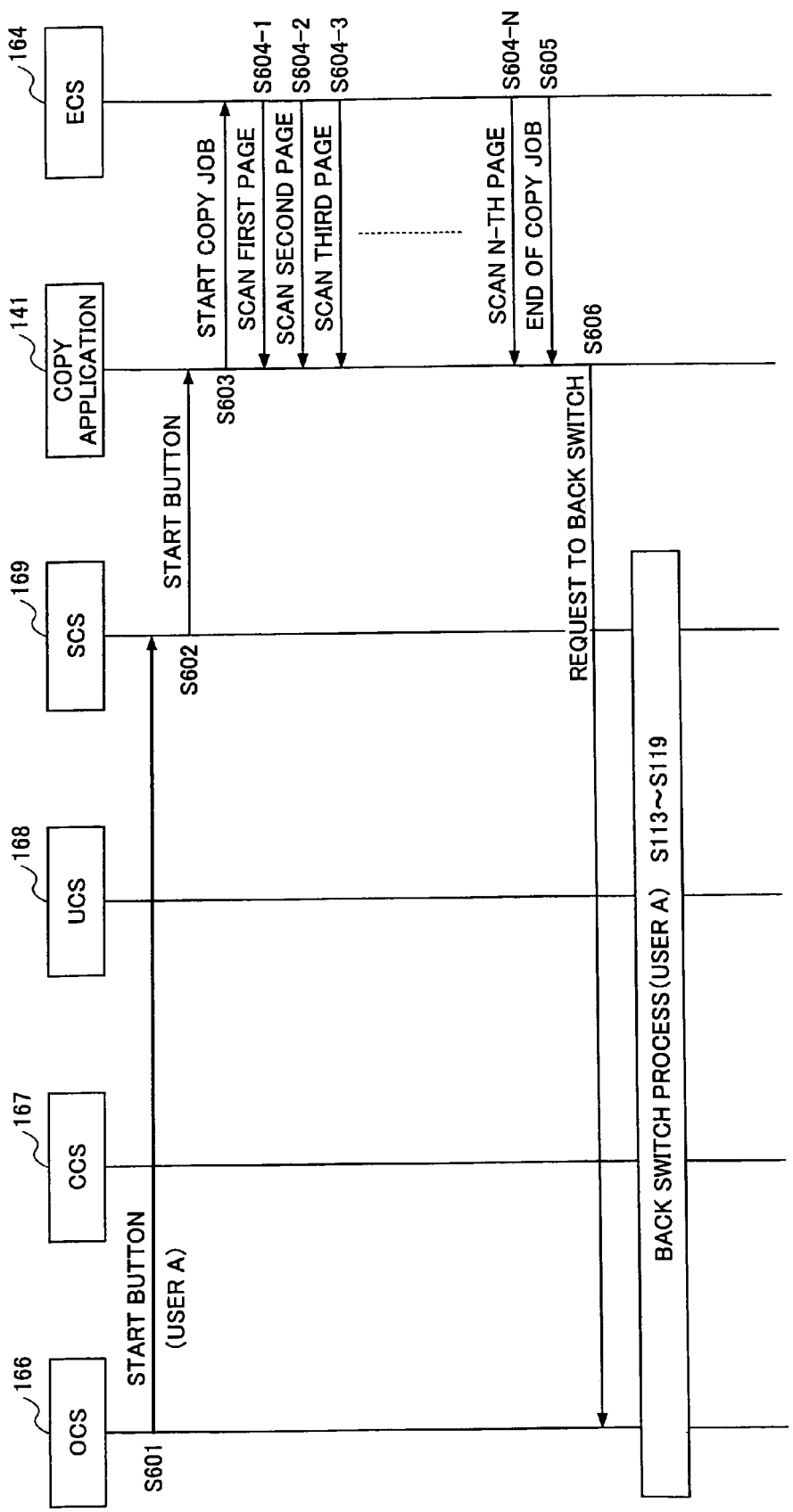

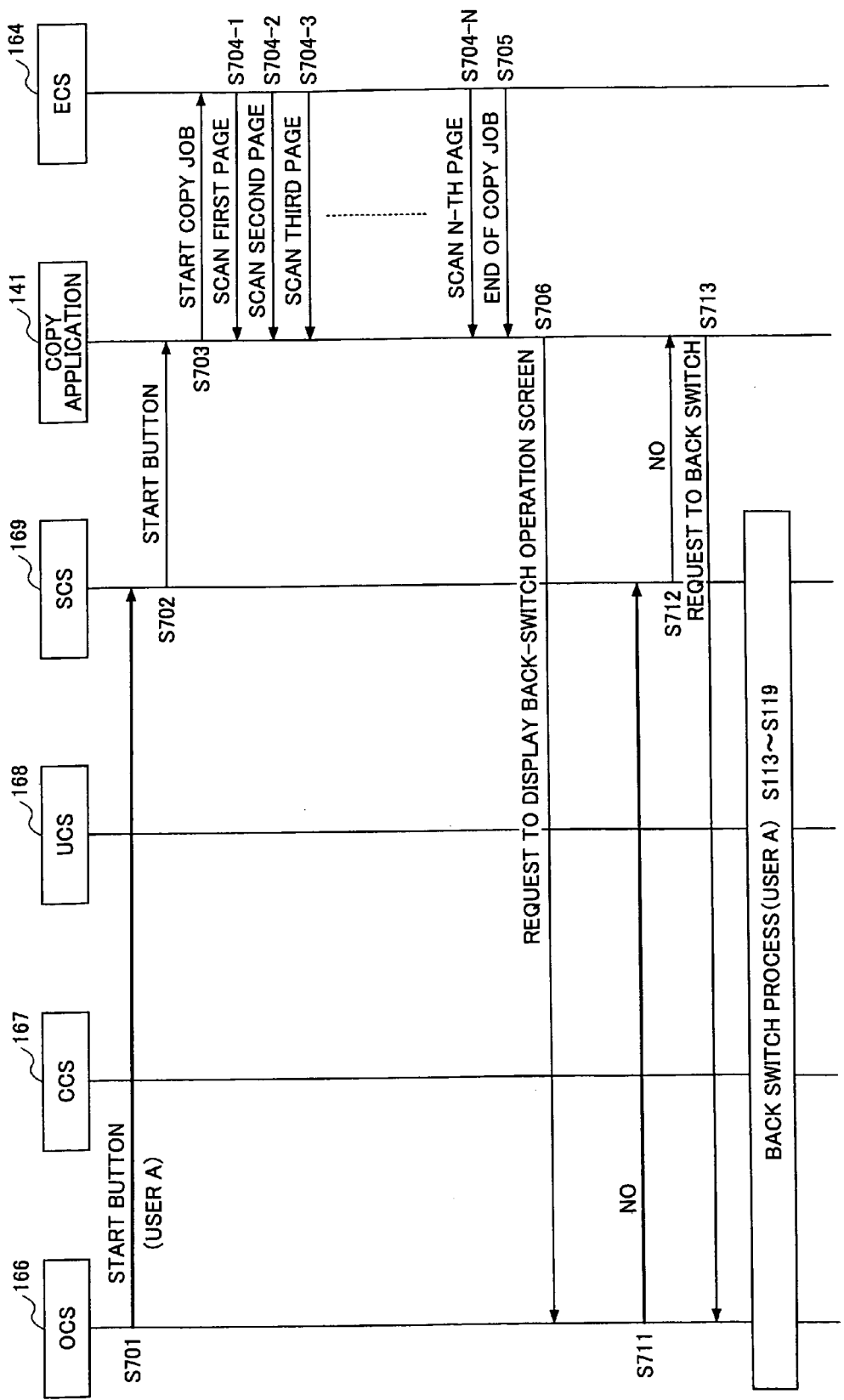

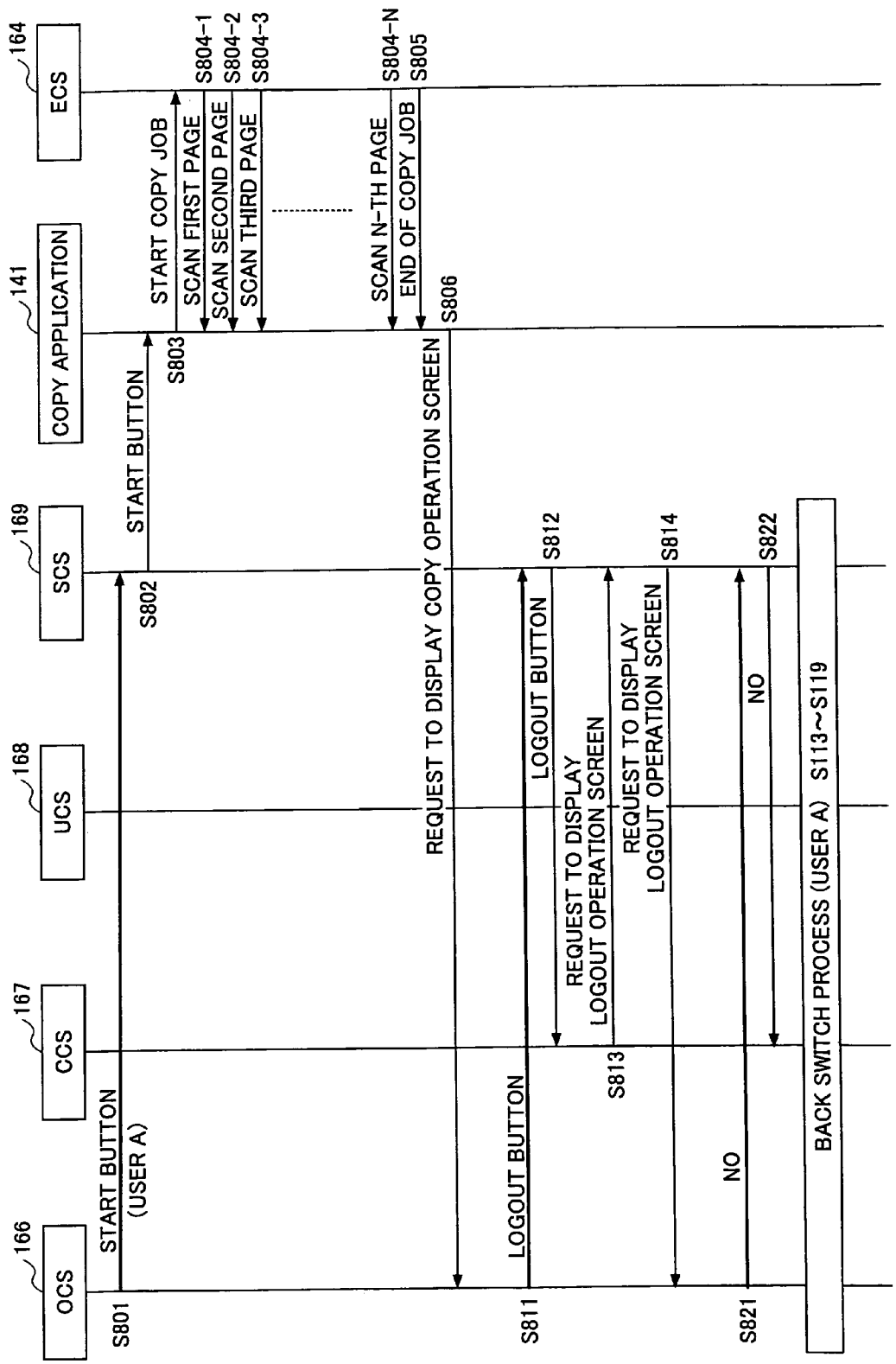

INFORMATION PROCESSING APPARATUS ALLOWING MULTIPLE LOGINS

BACKGROUND OF THE INVENTION

1. Field of the Invention

The present invention generally relates to information devices provided with information processing functions as primary functions, information processing apparatuses such as electronic equipment provided with information processing functions as secondary functions, information processing methods, information processing programs, and record media such as CD-ROMs. An example of information devices provided with information processing functions as primary functions may be a personal computer. An example of electronic equipment provided with information processing functions as secondary functions may be an image forming apparatus such as a copier, a printer, a scanner, a facsimile device, a multifunction peripheral, etc., for which remarkable progress has been made in recent years in terms of information processing functionalities.

2. Description of the Related Art

In recent years, multifunction peripherals provided with the functions of a copier, a printer, a scanner, and a facsimile device have been available in the market. Multifunction peripherals are equipped with such hardware as an imaging unit, a printing unit, a communication unit, an operation/display unit, and so on, and are provided with four types of software units corresponding to a copier, a printer, a scanner, and a facsimile device. The switching of these software units makes it possible to function as a copier, a printer, a scanner, or a facsimile device. When functioning as a copier or printer, these multifunction peripherals print images on print sheets or the like. When functioning as a copier or scanner, these multifunction peripherals capture images from original documents or the like. When functioning as a facsimile device, these multifunction peripherals exchange images with other equipment through telephone lines or the like.

[Patent Document 1] Japanese Patent Application Publication No. 2002-84383

[Patent Document 2] Japanese Patent Application Publication No. 2001-202208

[Patent Document 3] Japanese Patent Application Publication No. 9-130532

[Patent Document 4] Japanese Patent Application Publication No. 7-319646

In recent years, there has been an increase in the number of image forming apparatuses that are designed to provide a login/logout function for the purpose of improving security. This function is supposed to allow only the users capable of logging into image forming apparatuses to use the image forming apparatuses.

In the image forming apparatuses that are designed to provide the login/logout function, the login/logout function is introduced at the expense of loss of the functions to permit sharing by a plurality of users and to provide the parallel processing of a plurality of jobs. Because of this, problems arise such as an incapability of permitting a job interruption, an incapability of permitting a job reservation, a necessity to hold a next job in a wait state, etc. When sharing by a plurality of users or the parallel processing of a plurality of jobs are not achieved in multifunction peripherals, these multifunction peripherals with all their functions cannot prove their full merits. Even in consideration of such demerits, however, security cannot be compromised.

Accordingly, there is a need for an information processing apparatus such as an image forming apparatus that permits sharing by a plurality of users while providing improved security.

SUMMARY OF THE INVENTION

It is a general object of the present invention to provide an information processing apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an information processing apparatus particularly pointed out in the specification in such full, clear, concise, and exact terms as to enable a person having ordinary skill in the art to practice the invention.

To achieve these and other advantages in accordance with the purpose of the invention, the invention provides an information processing apparatus which accepts operating instruction only from a user who has logged into the information processing apparatus and is assigned with a screen of the information processing apparatus. The information processing apparatus includes a login processing unit configured to allow a first user to login and be assigned with the screen and to allow a second user, after the first user, to login and be assigned with the screen by reassigning the screen from the first user to the second user while maintaining a login status of the first user.

According to another aspect of the invention, the information processing apparatus further includes a logout processing unit configured to allow the second user to logout while maintaining the login status of the first user, followed by placing the information processing apparatus in a state of waiting for an input of authentication information.

According to another aspect of the invention, a first job requested by the first user and a second job requested by the second user are concurrently performed in parallel if the first job and the second job do not conflict in terms of use of hardware.

According to another aspect of the invention, the information processing apparatus further includes an input unit configured to receive character inputs that are typed in, the character inputs representing the authentication information.

According to another aspect of the invention, the information processing apparatus further includes a reader unit configured to read the authentication information from a record medium that has the authentication information recorded therein.

According to another aspect of the invention, the information processing apparatus further includes a switch operation screen providing unit configured to provide a switch operation screen that is designed to respond to a predetermined operation thereon by causing the screen to be reassigned from one user to another.

According to another aspect of the invention, the information processing apparatus further includes a logout operation screen providing unit configured to provide a logout operation screen that is designed to respond to a predetermined operation thereon by causing a user without an assigned screen to logout.

According to another aspect of the invention, the screen is configured to display an indicator indicating presence of a user who has logged in and is not assigned with the screen.

According to another aspect of the invention, a user who is not assigned with the screen is automatically forced to logout after passage of a predetermined time period.

According to another aspect of the invention, the information processing apparatus further includes a notification unit configured to indicate on the screen an error of a job requested by a user who is not assigned with the screen.

According to another aspect of the invention, the information processing apparatus further includes a notification setting screen providing unit configured to provide a notification setting screen that is designed to cause a setting to be made as to whether the error is to be indicated.

According to another aspect of the invention, the information processing apparatus further includes a notification unit configured to report by email an error of a job requested by a user who is not assigned with the screen.

According to another aspect of the invention, the information processing apparatus further includes a notification setting screen providing unit configured to provide a notification setting screen that is designed to cause a setting to be made as to whether the error is to be reported by email.

According to another aspect of the invention, the information processing apparatus further includes a notification unit configured to report by a lamp an error of a job requested by a user who is not assigned with the screen.

According to another aspect of the invention, the information processing apparatus further includes a notification setting screen providing unit configured to provide a notification setting screen that is designed to cause a setting to be made as to whether the error is to be reported by the lamp.

According to another aspect of the invention, the screen is reassigned from a given user to another user in response to a completion of a job requested by the given user.

According to another aspect of the invention, a switch operation screen is automatically presented in order to reassign the screen from a given user to another user in response to a completion of a job requested by the given user.

According to another aspect of the invention, the information processing apparatus functions as an image forming apparatus.

According to another aspect of the invention, an information processing method performed by an information processing apparatus which accepts operating instruction only from a user who has logged into the information processing apparatus and is assigned with a screen of the information processing apparatus includes a login processing step of allowing a first user to login and be assigned with the screen, and of allowing a second user, after the first user, to login and be assigned with the screen by reassigning the screen from the first user to the second user while maintaining a login status of the first user.

According to another aspect of the invention, the information processing method further includes a logout processing step of allowing the second user to logout while maintaining the login status of the first user, followed by placing the information processing apparatus in a state of waiting for an input of authentication information.

According to another aspect of the invention, a first job requested by the first user and a second job requested by the second user are concurrently performed in parallel if the first job and the second job do not conflict in terms of use of hardware.

According to another aspect of the invention, the information processing apparatus is an image forming apparatus.

According to another aspect of the invention, a computer-readable medium has a program embodied therein for causing a computer to serve as an information processing apparatus which accepts operating instruction only from a user who has logged into the information processing apparatus and is assigned with a screen of the information processing apparatus, and the program includes a login processing unit configured to allow a first user to login and be assigned with the screen and to allow a second user, after the first user, to login and be assigned with the screen by reassigning the screen from the first user to the second user while maintaining a login status of the first user.

According to another aspect of the invention, the program further includes a logout processing unit configured to allow the second user to logout while maintaining the login status of the first user, followed by placing the information processing apparatus in a state of waiting for an input of authentication information.

According to another aspect of the invention, the program is configured such that a first job requested by the first user and a second job requested by the second user are concurrently performed in parallel if the first job and the second job do not conflict in terms of use of hardware.

As described above, the present invention makes it possible to improve security in the information processing apparatus such as an image forming apparatus and also to achieve sharing by a plurality of users.

BRIEF DESCRIPTION OF THE DRAWINGS

Other objects and further features of the present invention will be apparent from the following detailed description when read in conjunction with the accompanying drawings, in which:

FIG. 8 is a sequence diagram showing the second embodiment of the login process and logout process in the multifunction peripheral shown in FIG. 1;

FIGS. 9A through 9F are illustrative drawings showing the transition of screens according to a third embodiment of the login process and logout process in the multifunction peripheral shown in FIG. 1;

FIG. 12 is a sequence diagram relating to the front user switching operation screen;

FIG. 14 is a sequence diagram relating to the back user logout operation screen;

FIGS. 16A and 16B are illustrative drawings for explaining a back user's timeout;

FIGS. 17A through 17F are illustrative drawings for explaining the notification of a back user job error;

FIG. 19 is a sequence diagram showing the back switch of the front user following the completion of the front user's job;

FIG. 21 is a sequence diagram showing the back switch of the front user following the completion of the front user's job;

FIG. 23 is a sequence diagram showing the back switch of the front user following the completion of the front user's job;

DESCRIPTION OF THE PREFERRED EMBODIMENTS

In the following, embodiments of the present invention will be described with reference to the accompanying drawings.

Figure 25:
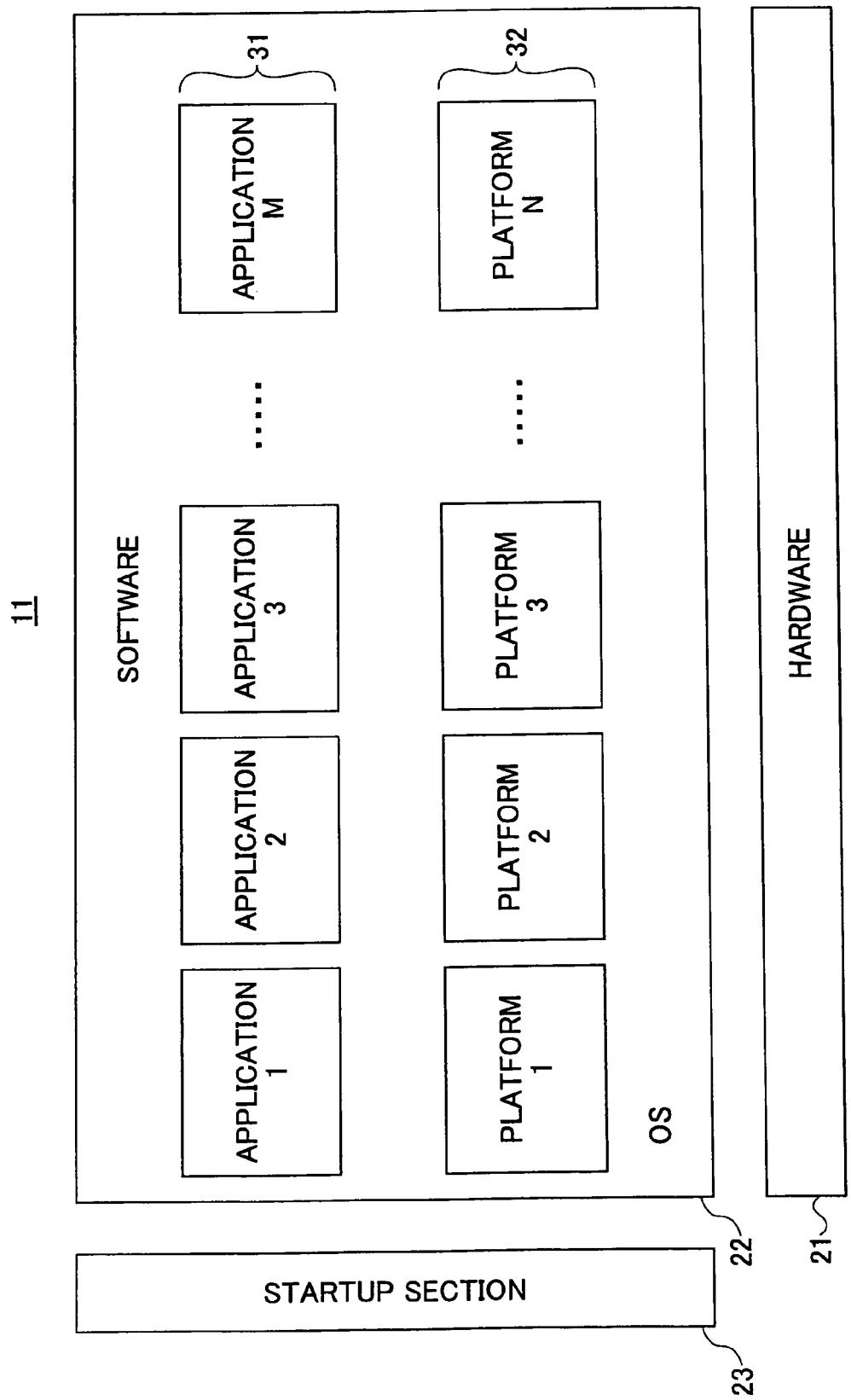
FIG. 25 is a drawing showing an information processing apparatus according to an embodiment of the present invention.

FIG. 25 is a drawing showing an information processing apparatus 11 according to an embodiment of the present invention. The information processing apparatus 11 of FIG. 25 includes hardware 21, software 22, and a startup section 23.

The hardware 21 of the information processing apparatus 11 includes an information processing unit comprised of a CPU, a ROM, a RAM, a HDD, etc., a communication unit comprised of a modem, a NIC, etc., and an operation/display unit comprised of a keyboard, a mouse, a display, etc.

The software 22 of the information processing apparatus 11 includes applications 31 and platforms 32. The platforms 32 include a module for controlling the image processing unit, a module for arbitrating for the communication unit, a module for controlling the operation/display unit, a module for managing and controlling user information, and a module for managing and controlling the system. These program modules run in parallel on a process-by-process basis on an OS (operating system) such as UNIX (registered trademark).

The startup section 23 is activated first at the time of power-on of the information processing apparatus 11. In response, the OS such as UNIX (registered trademark) starts, followed by execution of the applications 31 and the platforms 32. These programs may be stored in the HDD or a memory card, and may be retrieved from the HDD or memory card to be executed by using the space of the RAM.

Examples of the information processing apparatus 11 shown in FIG. 25 include an information device provided with information processing functions as primary functions and electronic equipment provided with information processing functions as ancillary functions. An example of the information device provided with information processing functions as primary functions may be a personal computer. An example of the electronic equipment provided with information processing functions as ancillary functions may be an image forming apparatus such as a copier, a printer, a scanner, a facsimile device, a multifunction peripheral, etc., for which remarkable progress has been made in recent years in terms of information processing functionalities. In the following, a description will be given of a multifunction peripheral 101 as an example of the information processing apparatus 11.

Figure 1:
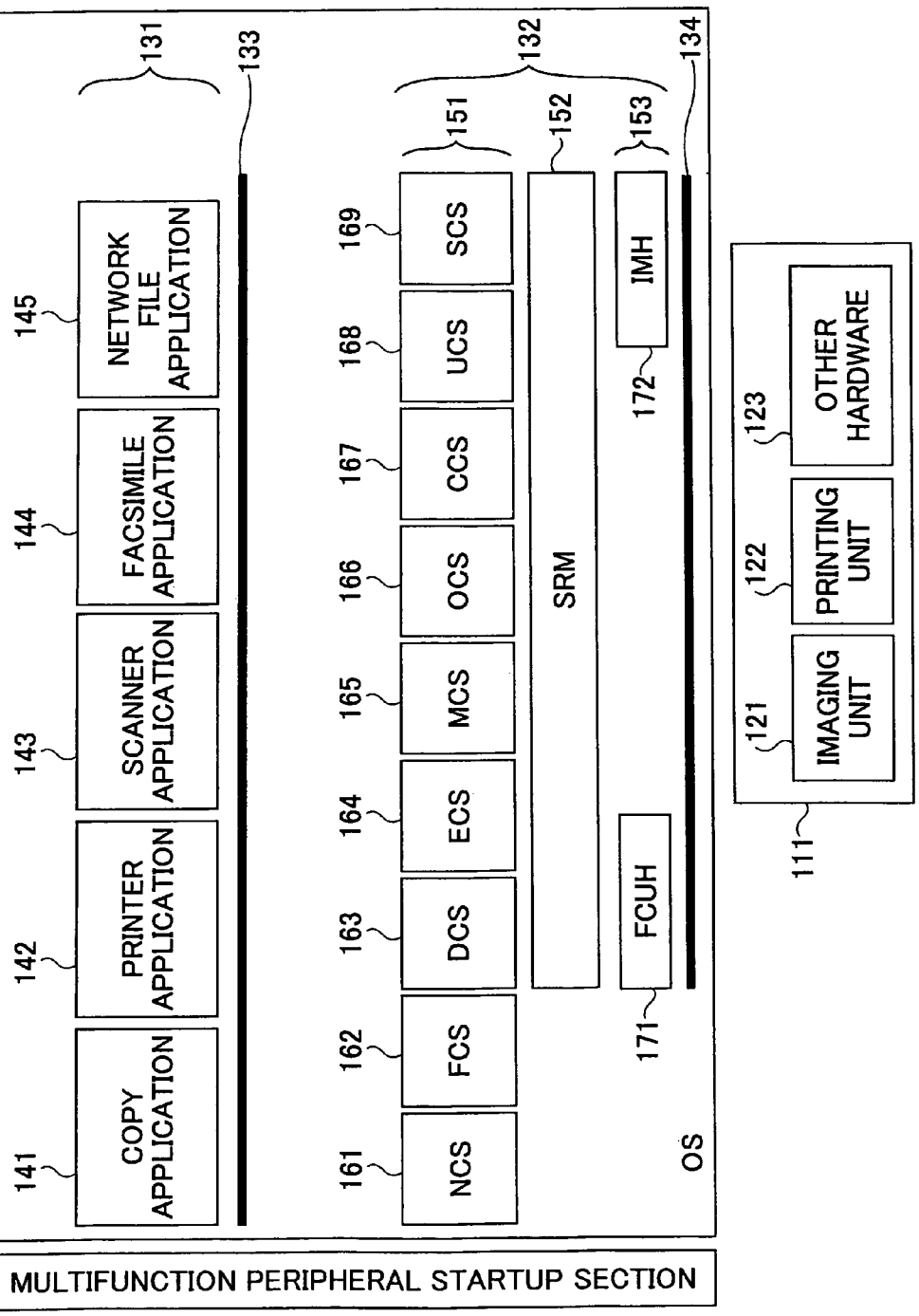
FIG. 1 is a drawing showing a multifunction peripheral according to an embodiment of the present invention.

FIG. 1 is a drawing showing the multifunction peripheral 101 according to an embodiment of the present invention. The multifunction peripheral 101 of FIG. 1 includes hardware 111, software 112, and a multifunction peripheral startup section 113. The multifunction peripheral 101 serves as a copier, a printer, a scanner, and a facsimile device.

The hardware 111 of the multifunction peripheral 101 includes an imaging unit 121, a printing unit 122, and other hardware 123.

The imaging unit 121 serves to capture images (image data) from document copies, and is used when the multifunction peripheral 101 functions as a copier, a scanner, or a facsimile device. The imaging unit 121 may be for black and white images or may be for color images. The imaging unit 121 is provided with a document setting unit, which is a mechanism for document copies.

The printing unit 122 serves to print images (image data) on a print medium such as print sheets or the like, and is used when the multifunction peripheral 101 functions as a copier, a printer, or a facsimile device. The printing unit 122 may be for black-and-white images or may be for color images. The printing unit 122 may be of an electrophotography type, and includes a photoconductive body, a charger, an exposure unit, a developer, a transfer unit, a fixer, etc. The printing unit 122 is provided with a sheet-feeder unit, a sheet-ejection unit, a print-sheet conveyer mechanism, etc., which are provided for the purpose of handling the print sheets.

Figure 2:
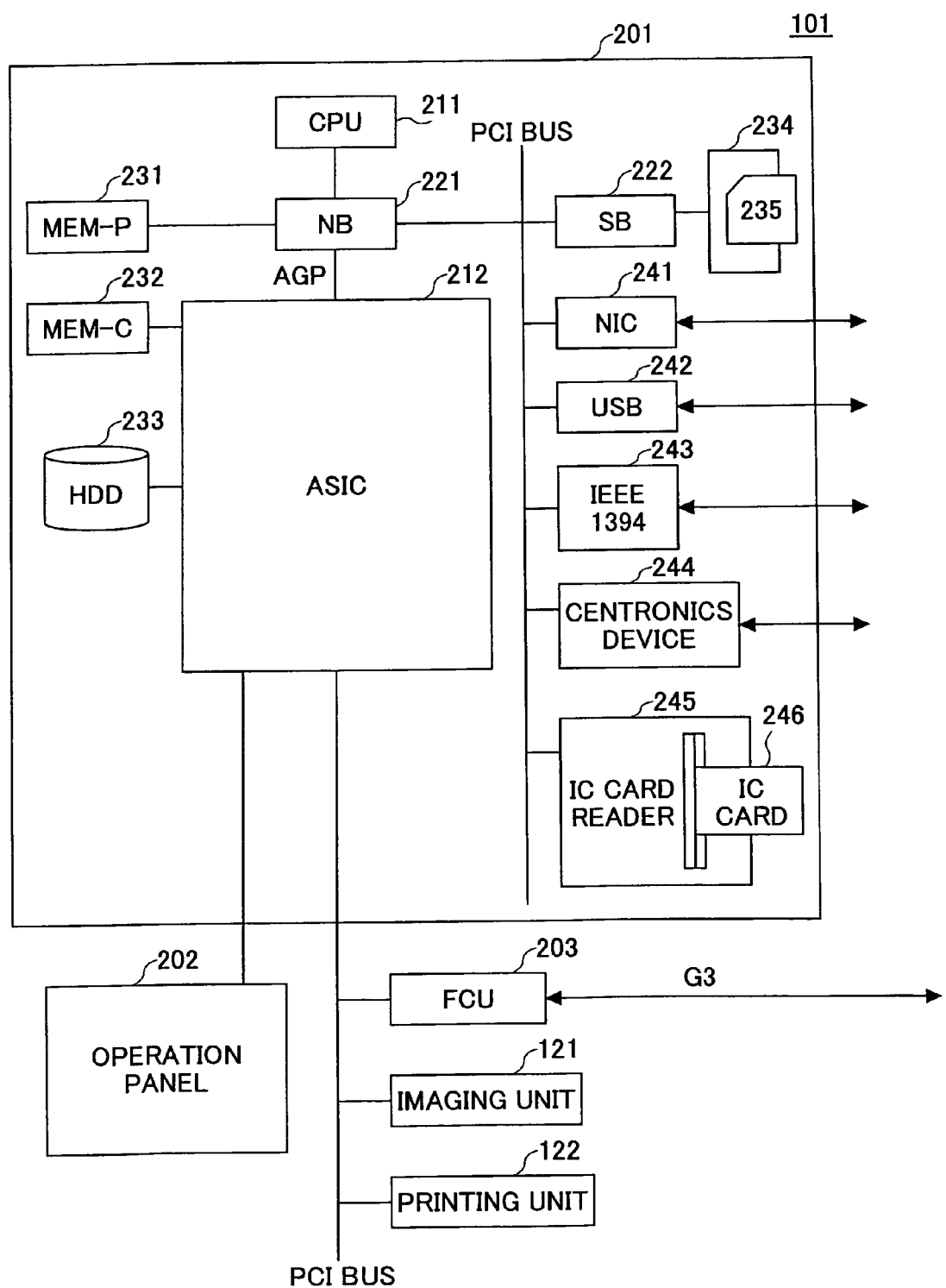
FIG. 2 is a drawing showing the hardware configuration of the multifunction peripheral shown in FIG. 1.

A description of the other hardware 123 will be given when FIG. 2 is described.

The software 112 of the multifunction peripheral 101 includes applications 131 and platforms 132. These programs run in parallel on a process-by-process basis under the control of an OS (operating system) such as UNIX (registered trademark).

The applications 131 serve to provide information processing functions corresponding to the functions of a copier, a printer, a scanner, a facsimile device, and the like. The applications 131 include a copy application 141 serving as an application for copying, a printer application 142 serving as an application for printing, a scanner application 143 serving as an application for scanning, a facsimile application 144 serving as an application for providing facsimile functions, and a network file application 145 serving as an application for handling network files. The network file application 145 is comprised of a Web browser for accessing HTML documents and the like and a Web server software unit for delivering HTML documents and the like.

The platforms 132 serve to perform information processing in response to requests issued from the applications 131. For the purpose of receiving requests from the applications 131, an application program interface (API) 133 is utilized that serves to receive the requests by use of predefined functions. For the purpose of performing processing to attend to the requests, an engine interface 134 is utilized. The platforms 132 include control services 151, a system resource manager 152, and handlers 153.

The control services 151 decode a request issued from the applications 131, and generate a request to acquire the hardware 111 according to the decoded results. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169.

A process of the NCS 161 serves as an intermediary for the purpose of performing data communication through a network or the like. A process of the FCS 162 provides an API for the purpose of performing image data communication, image data capturing, image data printing, etc., as facsimile functions. A process of the DCS 163 controls the delivery of document data that are stored in the multifunction peripheral 101. A process of the ECS 164 controls engines such as the imaging unit 121 and the printing unit 122. A process of the MCS 165 controls the memories and hard disk drive in relation to the storing and processing of image data. A process of the OCS 166 controls the operation panel. A process of the CCS 167 controls authentication processes and accounting processes. A process of the UCS 168 manages and controls user information. A process of the SCS 169 manages and controls the system.

The system resource manager (SRM) 152 arbitrates requests for acquiring the hardware 111, and attends to control for performing requested processing according to the arbitration. In detail, a process of the SRM 152 checks whether the hardware 111 requested to be acquired is available (i.e., whether the request is not in conflict with other requests), and informs individual processes of the control services 151 if availability is confirmed. Further, the process of the SRM 152 generates a schedule of use of the hardware 111 that is requested to be acquired, and exercises control for performing the requested processing according to the generated schedule.

The handlers 153 manage the hardware 111 according to the arbitration. The handlers 153 include a facsimile control unit handler (FCUH) 171 and an image memory handler (IMH) 172. The FCUH 171 manages the facsimile control unit. The IMH 172 allocates memory space to each process, and manages the memory space allocated to each process.

The multifunction peripheral startup section 113 is activated first at the time of power-on of the multifunction peripheral 101. In response, the OS such as UNIX (registered trademark) starts, followed by execution of the applications 131 and the platforms 132. These programs may be stored in the HDD or a memory card, and may be retrieved from the HDD or memory card to be executed by using the space of the RAM.

FIG. 2 is a drawing showing the hardware configuration of the multifunction peripheral 101 shown in FIG. 1. The hardware 111 of the multifunction peripheral 101 includes a controller 201, an operation panel 202, a facsimile control unit (FCU) 203, the imaging unit 121, and the printing unit 122. Constituent units other than the imaging unit 121 and the printing unit 122 correspond to the other hardware 123 shown in FIG. 1.

The controller 201 includes a CPU 211, an ASIC 212, a NB (north bridge) 221, a SB (south bridge) 222, a MEM-P (system memory) 231, a MEM-C (local memory) 232, an HDD (hard disk drive) 233, a memory card slot 234, an NIC (network interface controller) 241, a USB device 242, an IEEE 1394 device 243, a Centronics device 244, and an IC card reader 245.

The CPU 211 is an IC that perform various information processing, and executes the applications 131 and the platforms 132 in parallel on a process-specific basis by using an OS such as UNIX (registered trademark). The ASIC 212 is an IC for image processing. The NB 221 is a bridge for connecting between the CPU 211 and the ASIC 212. The SB 222 is a bridge for coupling the NB 221 to peripheral devices and the like. The ASIC 212 and the NB 221 are connected to each other via AGP (accelerated graphics port).

The MEM-P 231 is a memory connected to the NB 221. The MEM-C 232 is a memory connected to the ASIC 212. The HDD 233 is a storage connected to the ASIC 212, and serves to store image data, document data, programs, font data, form data, etc. The memory card slot 234 is a slot connected to the SB 222, and receives a memory card 235 when it is inserted.

The NIC 241 is a controller for performing data communication through a network or the like by using MAC addresses or the like. The USB device 242 serves to provide a serial port that conforms to the USB standard. The IEEE 1394 device 243 serves to provide a serial port that conforms to the IEEE 1394 standard. The Centronics device 244 serves to provide a parallel port that conforms to the Centronics standard. The IC card reader 245 serves to read an IC card 246. The NIC 241, the USB device 242, the IEEE 1394 device 243, the Centronics device 244, and the IC card reader 245 are coupled to the NB 221 and the SB 222 through a PCI (peripheral component interconnect) bus.

The operation panel 202 is the hardware (operating unit) used by an operator to enter inputs into the multifunction peripheral 101, and is also the hardware (display unit) used by an operator to receive an output from the multifunction peripheral 101. The operation panel 202 is connected to the ASIC 212. The FCU 203, the imaging unit 121, and the printing unit 122 are coupled to the ASIC 212 through a PCI (peripheral component interconnect) bus.

Figure 3:
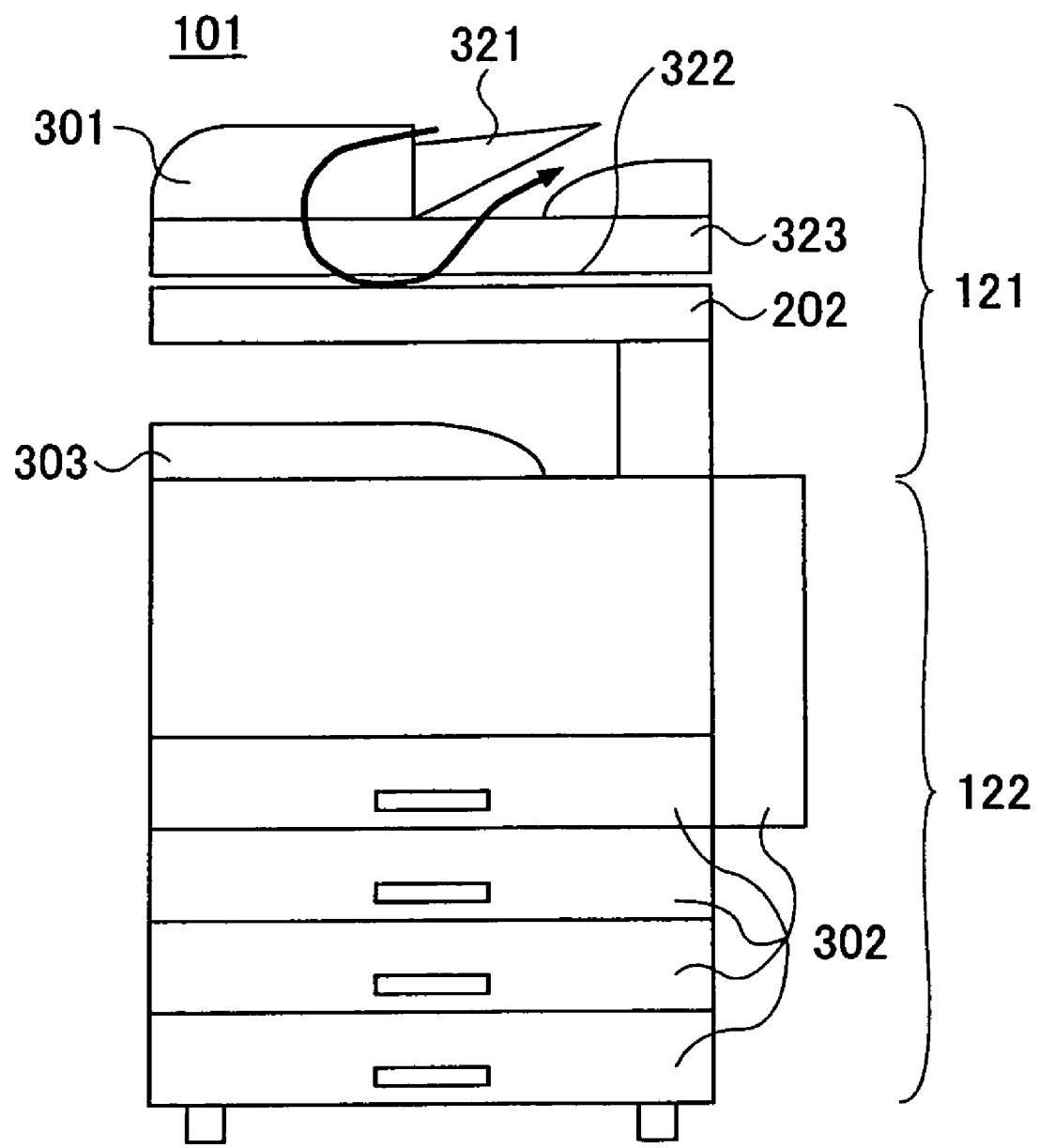
FIG. 3 is a drawing showing an exterior appearance of the multifunction peripheral shown in FIG. 1.

FIG. 3 is a drawing showing an exterior appearance of the multifunction peripheral 101 shown in FIG. 1. FIG. 3 illustrates the position of the imaging unit 121, the position of the printing unit 122, and the position of the operation panel 202. FIG. 3 further illustrates a document setting unit 301 for setting document copies in place, a sheet feeder unit 302 for supplying print sheets or the like, and a sheet ejection unit 303 to which print sheets or the like are ejected. The document setting unit 301 is part of the imaging unit 121. The sheet feeder unit 302 and the sheet ejection unit 303 are part of the printing unit 122.

Figure 4:
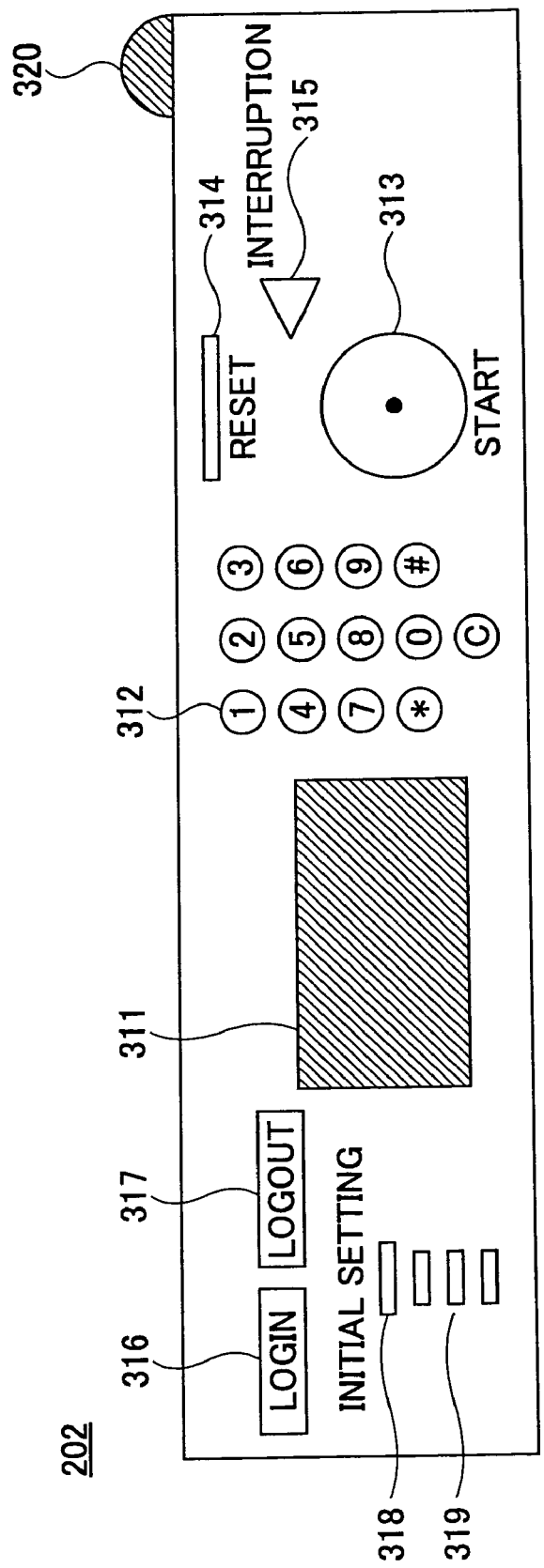
FIG. 4 is an illustrative drawing showing the configuration of an operation panel of the multifunction peripheral shown in FIG. 1.

As shown in FIG. 4, the operation panel 202 includes a touch panel 311, a numeric keypad 312, a start button 313, a reset button 314, an interruption button 315, a login button 316, a logout button 317, an initial setting button 318, a function key 319, and an alarm lamp 320.

The touch panel 311 is the hardware (operation unit) used for entering inputs through touch operation, and is also the hardware (screen display unit) used for presenting outputs on the display screen. The numeric keypad 312 is used to enter numeric inputs through key operations. The start button 313 is used to indicate a start by a button operation. The reset button 314 is used to initiate a reset operation by a button operation. The interruption button 315 is used to request an interruption by a button operation. The login button 316 is used to perform login by a button operation. The logout button 317 is used to perform logout by a button operation. The initial setting button 318 is used to call up an initial setting screen by a button operation. The function key 319 is used to call up a copy operation screen, a printer operation screen, a scanner operation screen, or a facsimile operation screen by a key operation. The alarm lamp 320 serves to signal an alarm by lamp illumination.

The multifunction peripheral 101 uses the imaging unit 121 to scan an image of a document copy in response to the pressing of the start button 313 when the document copy is set in the document setting unit 301. When functioning as a copier, the multifunction peripheral 101 uses the printing unit 122 to print the image on a print sheet or the like. When functioning as a facsimile device, the multifunction peripheral 101 uses the FCU 203 and the NIC 241 to transmit the image to another apparatus through a telephone line, a network, or the like. Print sheets or the like are supplied from the sheet feeder unit 302, and are ejected to the sheet ejection unit 303.

The document setting unit 301 includes an ADF (automatic document feeder) 321, a flat bed 322, and a flat bed cover 323.

The sheet feeder unit 302 includes four automatic feeder trays and one manual feeder tray. The sheet ejection unit 303 is comprised of a single sheet ejection tray.

The ADF 321 can receive a stack of document sheets. When document sheets are set in the ADF 321, the multifunction peripheral 101 uses the imaging unit 121 to scan images from the document sheets in response to the pressing of the start button 313. In detail, a stack of document sheets are set in the ADF 321, and the start button 313 is pressed, so that the ADF 321 carries the document sheets one after another along the path shown by an arrow in FIG. 3. The imaging unit 121 then scans images from the document sheets as they are carried one after another along the path shown by the arrow in FIG. 3.

The flat bed 322 receives a document sheet with its face down. When a document sheet is set on the flat bed 322, the multifunction peripheral 101 uses the imaging unit 121 to scan an image from the document sheet in response to the pressing of the start button 313. In detail, a document sheet is placed face down on the flat bed 322, and the start button 313 is pressed, so that the imaging unit 121 scans an image from the document sheet that is placed on the other side of the transparent flat bed 322.

[Login Process/Logout Process]

In the following, a description will be given of a login process and a logout process with respect to the multifunction peripheral 101 shown in FIG. 1.

The multifunction peripheral 101 shown in FIG. 1 is designed to allow a user to operate on the operation panel (operation panel 202) of the multifunction peripheral 101 when the user has logged into the multifunction peripheral 101 and is assigned with the screen (touch panel 311) of the operation panel (operation panel 202). That is, only when a user logs into the multifunction peripheral 101 and is assigned with the screen of the operation panel of the multifunction peripheral 101, operations on the operation panel of the multifunction peripheral 101 become effective. If a user intends to have copying performed by the multifunction peripheral 101, the user needs to log into the multifunction peripheral 101 and to have assigned thereto the screen of the multifunction peripheral 101 to give a copy instruction on the copy operation screen.

A plurality of users can log into the multifunction peripheral 101 shown in FIG. 1. Only one of those users can is assigned with the screen of the operation panel of the multifunction peripheral 101. The user who has logged into the multifunction peripheral 101 and is assigned with the screen of the operation panel of the multifunction peripheral 101 is referred to as a "front user". Users who have logged into the multifunction peripheral 101 but are not assigned with the screen of the operation panel of the multifunction peripheral 101 are referred to as "back users". The switching of a login user from a back user to the front user is referred to as a "front switch", and the switching of a login user from the front user to a back user is referred to as a "back switch".

FIGS. 5A through 5E are illustrative drawings showing the transition of screens according to a first embodiment of the login process and logout process in the multifunction peripheral 101 shown in FIG. 1.

Figure 5A:
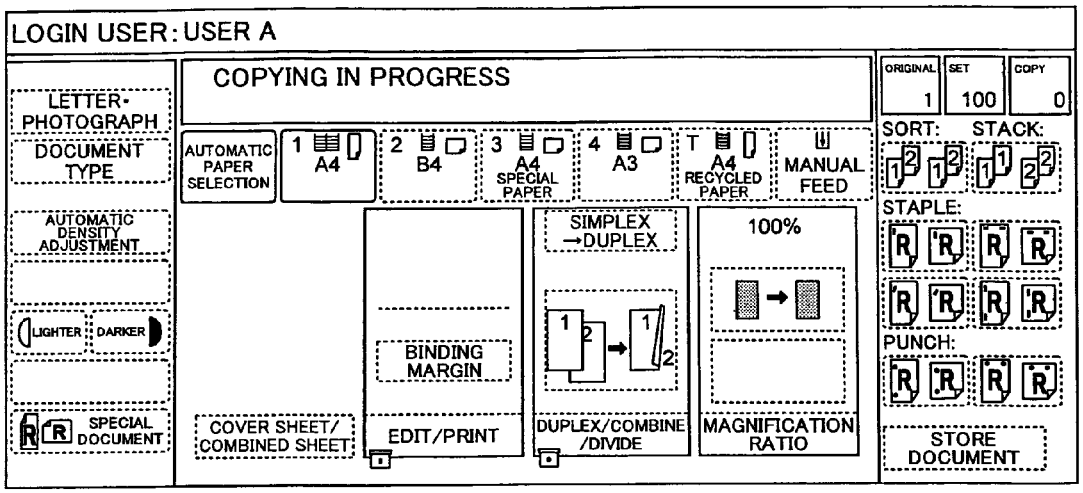
FIGS. 5A through 5E are illustrative drawings showing the transition of screens according to a first embodiment of a login process and logout process in the multifunction peripheral shown in FIG. 1.

On the screen shown in FIG. 5A, "LOGIN USER: USER A" is displayed at the top. This indicates that a user A having logged into the multifunction peripheral 101 is now assigned with the screen of the operation panel of the multifunction peripheral 101. Near the top on the screen shown in FIG. 5A, "COPYING IN PROGRESS" is displayed. This indicates that a copy job requested by the user A is underway. In this state of the screen, the login button 316 (see FIG. 4) is pressed, so that the screen changes into a screen shown in FIG. 5B, with which the multifunction peripheral 101 is in the state of waiting for an input of authentication information. A user B enters authentication information on the screen shown in FIG. 5B, and touches the OK button, which results in a change into the screen shown in FIG. 5C. With this screen change, the user B has logged into the multifunction peripheral 101.

Figure 5B:
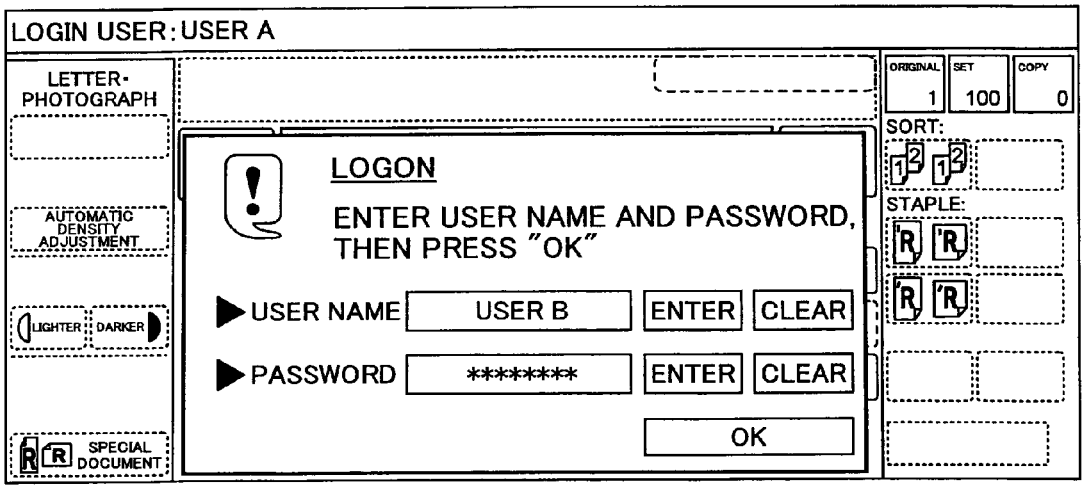
Figure 5C:
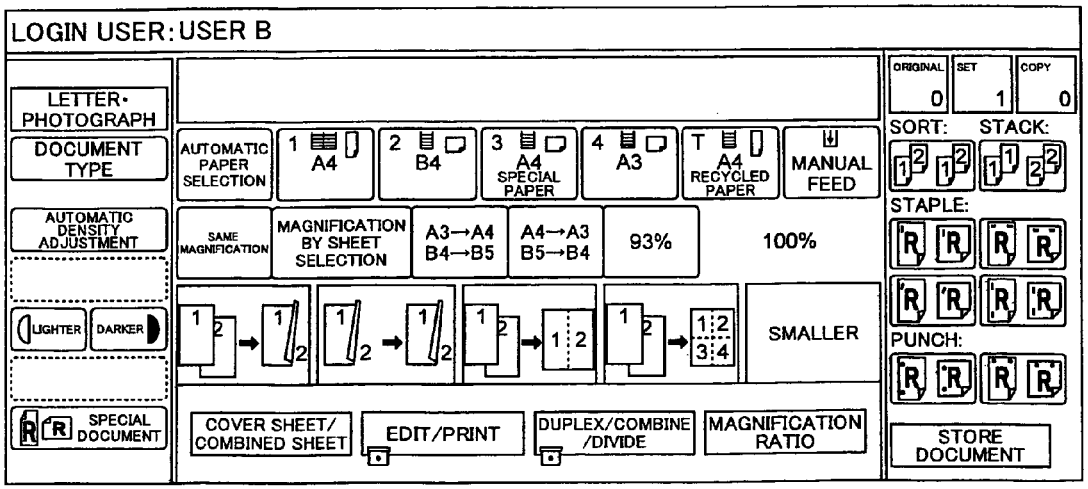

On the screen shown in FIG. 5C, "LOGIN USER: USER B" is displayed at the top. This indicates that the user B having logged into the multifunction peripheral 101 is now assigned with the screen of the operation panel of the multifunction peripheral 101. At this point in time, the copy job requested by the user A is still underway. When the copy job by the user A comes to an end, a screen change occurs so that a screen shown in FIG. 5D appears. On the screen shown in FIG. 5D, "READY TO COPY" is displayed. This indicates that a copy job for the user B can now be executed. In this state of the screen, the logout button 317 (see FIG. 4) is pressed, so that the screen changes into a screen shown in FIG. 5E, with which the multifunction peripheral 101 is in the state of waiting for an input of authentication information. With this, the user B has logged out from the multifunction peripheral 101.

In the login process from FIG. 5A to FIG. 5C, the multifunction peripheral 101 shown in FIG. 1 maintains the login state of the user A who has logged into the multifunction peripheral 101 and has been assigned with the screen of the operation panel of the multifunction peripheral 101, and allows the user B to log into the multifunction peripheral 101 and to have assigned thereto the screen of the operation panel of the multifunction peripheral 101. This achieves sharing by the user A and the user B (multiple logins), and makes it possible to continue a job requested by the user A while allowing preparation to be made for the start of a job for the user B.

Figure 5D:
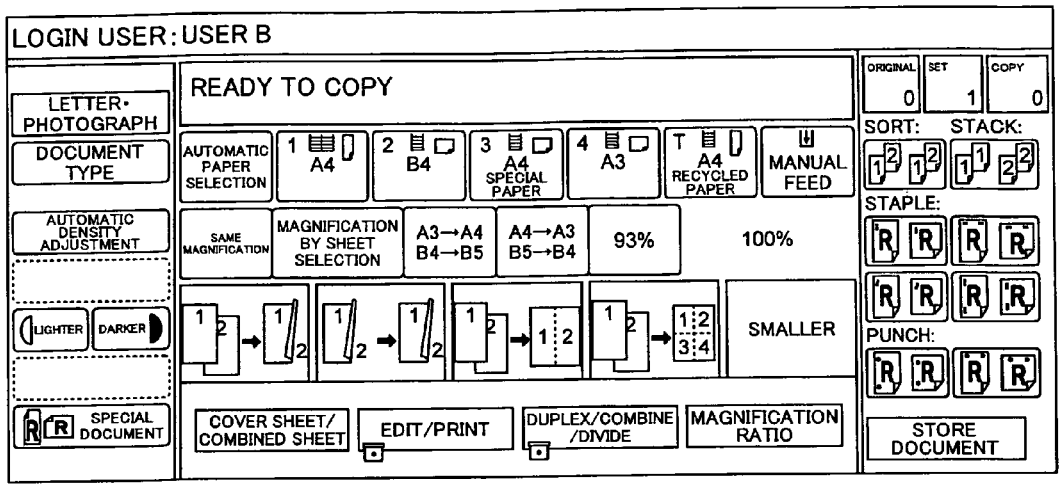
Figure 5E:
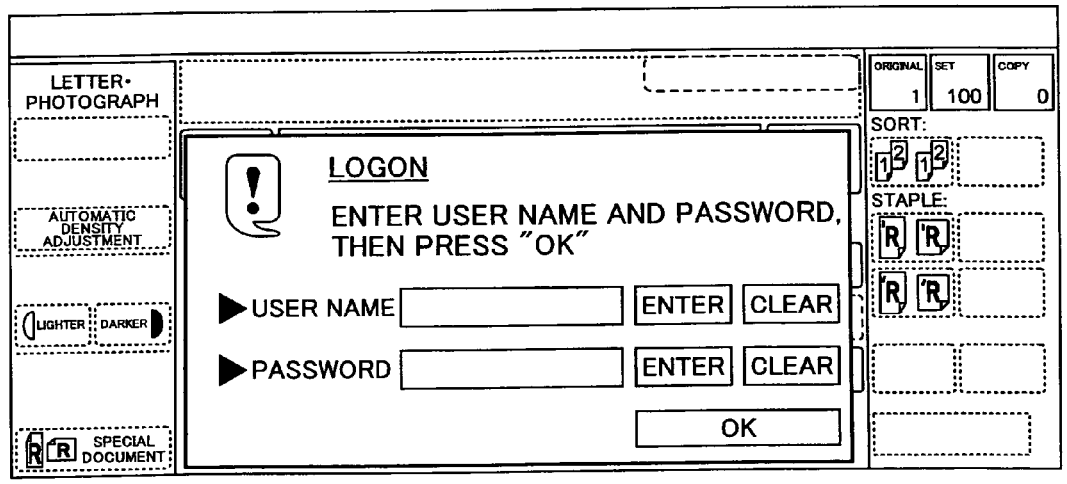

In the logout process from FIG. 5C to FIG. 5E, the multifunction peripheral 101 shown in FIG. 1 maintains the login status of the user A who has logged into the multifunction peripheral 101 and is not assigned with the screen of the operation panel of the multifunction peripheral 101, and allows the user B to logout who has logged into the multifunction peripheral 101 and has been assigned with the screen of the operation panel of the multifunction peripheral 101. This leaves the multifunction peripheral 101 in the state of waiting for the inputting of authentication information. If the user A is allowed to have assigned thereto the screen of the operation panel immediately after the logout of the user B, there is a risk that the user B may pretend to be the user A. In consideration of this, the multifunction peripheral 101 is placed in the state of waiting for the inputting of authentication information immediately after the logout of the user B, which prevents the user B from pretending to be the user A. Although the login status of the user A is maintained, the user A needs to enter the authentication information into the multifunction peripheral 101 again in order to have assigned thereto the screen of the operation panel.

Figure 6:
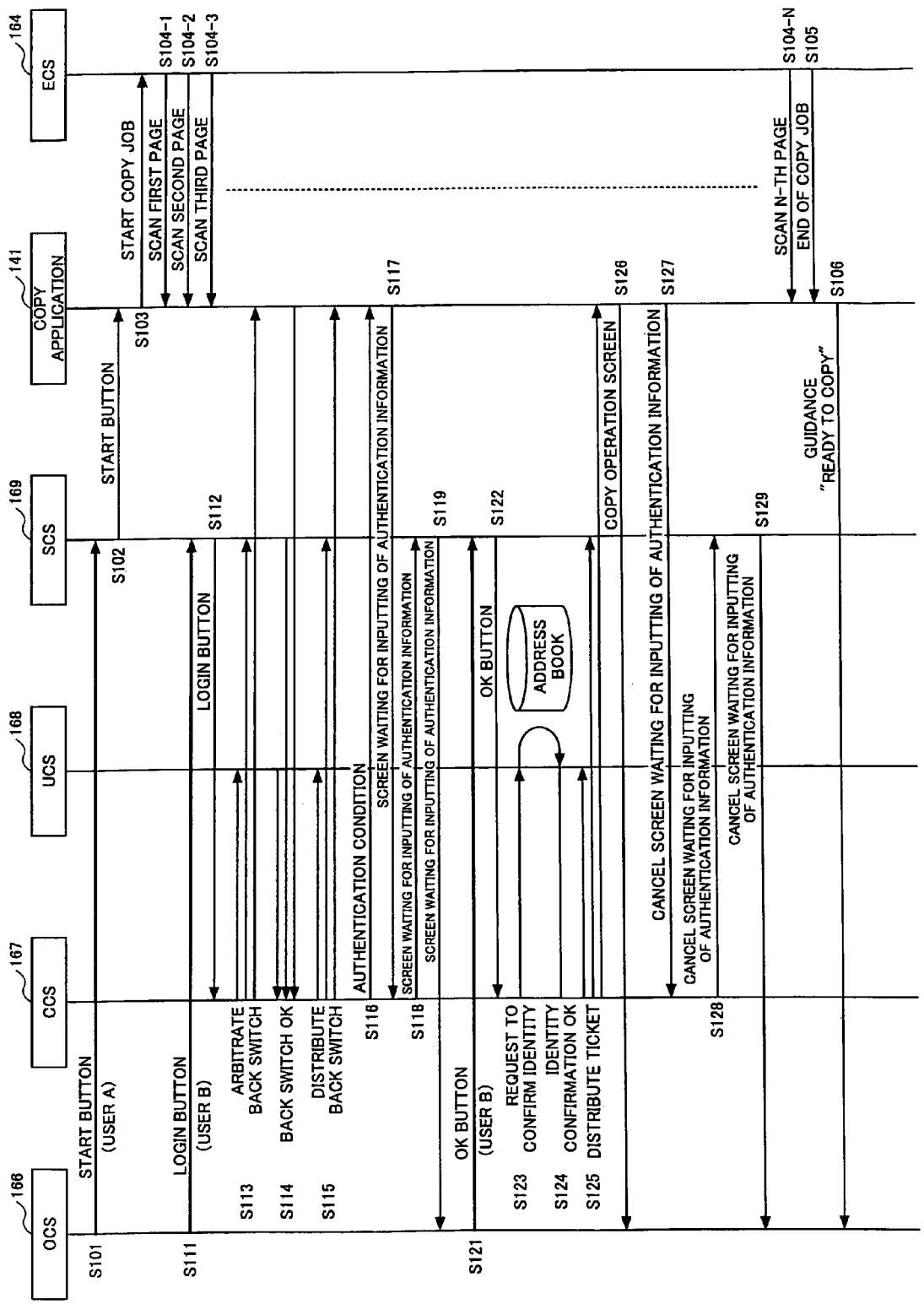
FIG. 6 is a sequence diagram showing the first embodiment of the login process and logout process in the multifunction peripheral shown in FIG. 1.

FIG. 6 is a sequence diagram showing the first embodiment of the login process and logout process in the multifunction peripheral 101 shown in FIG. 1.

The user A presses the start button 313 in order to execute a copy job by the multifunction peripheral 101. In response, the OCS 166 informs the SCS 169 of the pressing of the start button 313 (S101). In response, the SCS 169 informs the copy application 141 of the pressing of the start button 313 (S102). In response, the copy application 141 transmits a request to start the copy job to the ECS 164 (S103). The copy job requested by the user A is thus started, so that the process of scanning document copies set in the ADF 321 (FIG. 3) is carried out.

After this, the user B may press the login button 316 in an attempt to log into the multifunction peripheral 101. The OCS 166 informs the SCS 169 of the pressing of the login button 316 (S111). In response, the SCS 169 informs the CCS 167 of the pressing of the login button 316 (S112). In response, the CCS 167 performs arbitration for the user A's back switch (S113). If the user A's back switch is acceptable (S114), the user A's back switch is distributed (S115). Thereafter, the CCS 167 informs the copy application 141 of the authentication conditions (S116). In response, the copy application 141 transmits to the CCS 167 a request to display a screen waiting for the inputting of authentication information (S117). In response, the CCS 167 transmits to the SCS 169 a request to display a screen waiting for the inputting of authentication information (S118). In response, the SCS 169 transmits to the OCS 166 a request to display a screen waiting for the inputting of authentication information (S119). As a result, the screen waiting for the inputting of authentication information (FIG. 5B) is displayed, placing the multifunction peripheral 101 in the state of waiting for the inputting of authentication information.

Thereafter, the user B enters authentication information, and presses the OK button, resulting in the OCS 166 informing the SCS 169 of the pressing of the OK button (S121). In response, the SCS 169 informs the CCS 167 of the pressing of the OK button (S122). In response, the CCS 167 requests the UCS 168 to identify the user B with the authentication information (S123). If the user B is properly identified with the authentication information (S124), tickets for the user B with the authentication information are distributed (S125). Thereafter, the copy application 141 transmits to the OCS 166 a request to display a copy operation screen without the guidance information "READY TO COPY" (S126). The copy application 141 further transmits to the CCS 167 a request to cancel the screen waiting for the inputting of authentication information (S127). In response, the CCS 167 transmits to the SCS 169 a request to cancel the screen waiting for the inputting of authentication information (S128). In response, the SCS 169 transmits to the OCS 166 a request to cancel the screen waiting for the inputting of authentication information (S129). As a result, the copy operation screen (FIG. 5C) without the guidance information "READY TO COPY" is displayed.

The process of scanning document copies set in the ADF 321 (FIG. 3) is successively carried out (S104), so that the copy job requested by the user A comes to an end. In response, the ECS 164 transmits to the copy application 141 a response indicative of copy job completion (S105). In response, the copy application 141 transmits to the OCS 166 a request to display the guidance information "READY TO COPY" (S106). As a result, the copy operation screen (FIG. 5D) with the guidance information "READY TO COPY" is displayed.

It should be noted that the flow of the processes from S111 to S129 is the same even if the user B performs a job interruption operation or a job reservation operation.

FIGS. 7A through 7E are illustrative drawings showing the transition of screens according to a second embodiment of the login process and logout process in the multifunction peripheral 101 shown in FIG. 1.

Figure 7A:
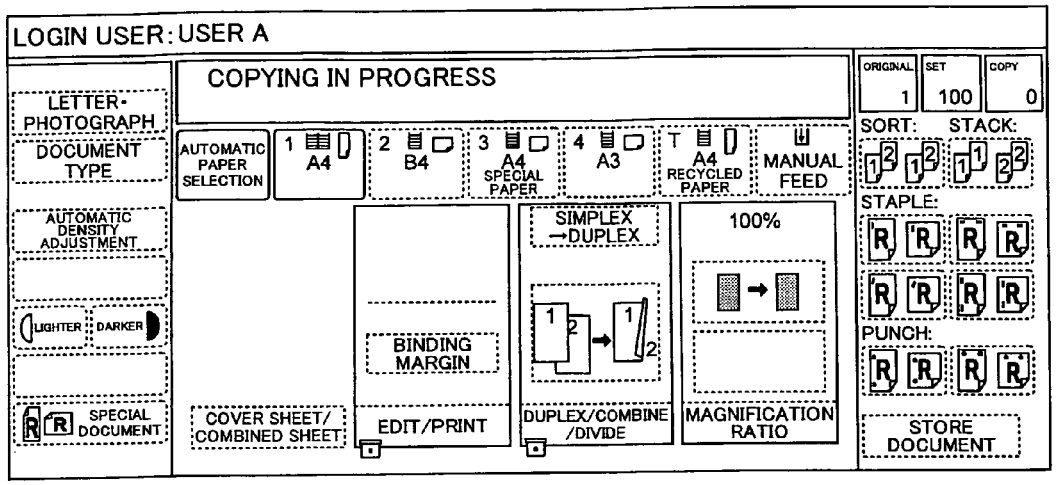
FIGS. 7A through 7E are illustrative drawings showing the transition of screens according to a second embodiment of the login process and logout process in the multifunction peripheral shown in FIG. 1.
Figure 7B:
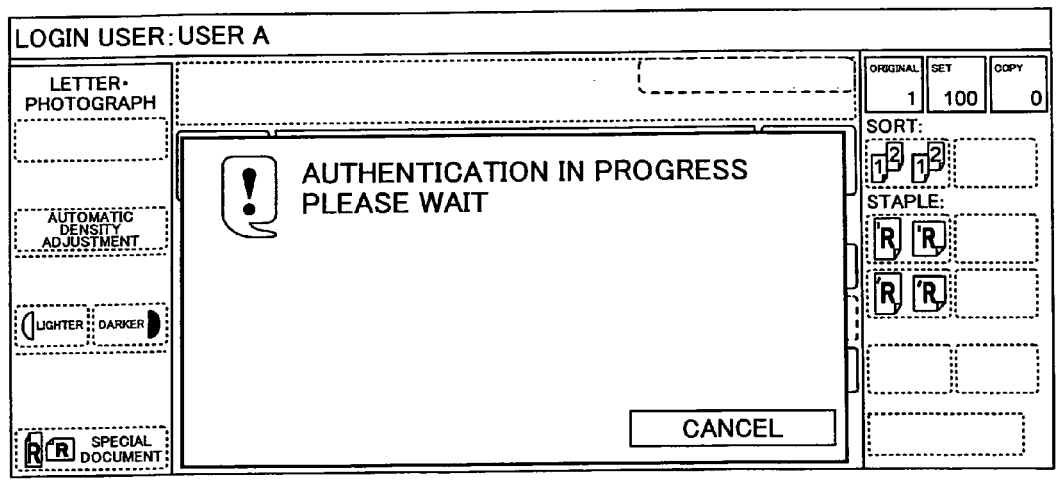

On the screen shown in FIG. 7A, "LOGIN USER: USER A" is displayed at the top. This indicates that a user A having logged into the multifunction peripheral 101 is now assigned with the screen of the operation panel of the multifunction peripheral 101. Near the top on the screen shown in FIG. 7A, "COPYING IN PROGRESS" is displayed. This indicates that a copy job requested by the user A is underway. In this state of the screen, a user B sets the IC card 246 (see FIG. 2) into the IC card reader 245 (see FIG. 2), so that the screen changes into a screen shown in FIG. 7B, which further changes into a screen shown in FIG. 7C. With these screen changes, the user B has logged into the multifunction peripheral 101.

Figure 7C:
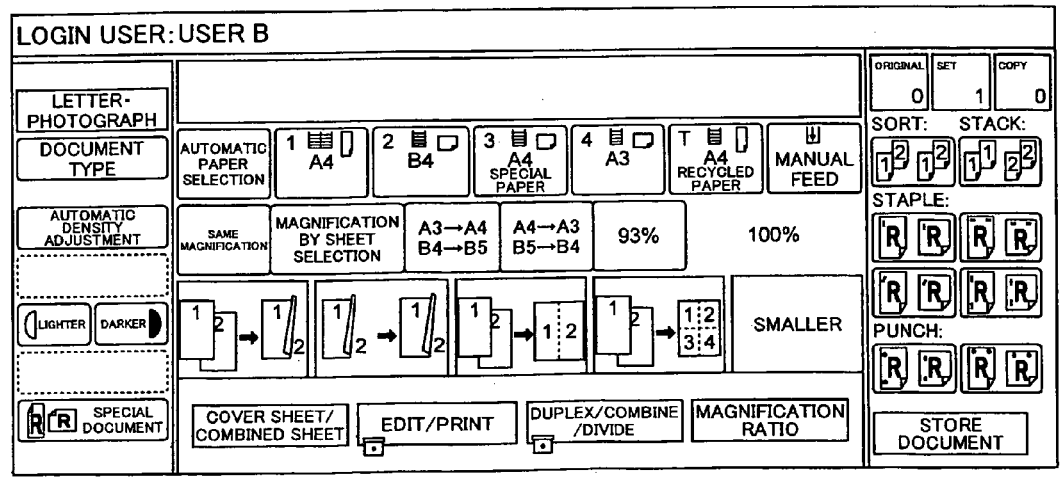
Figure 7D:
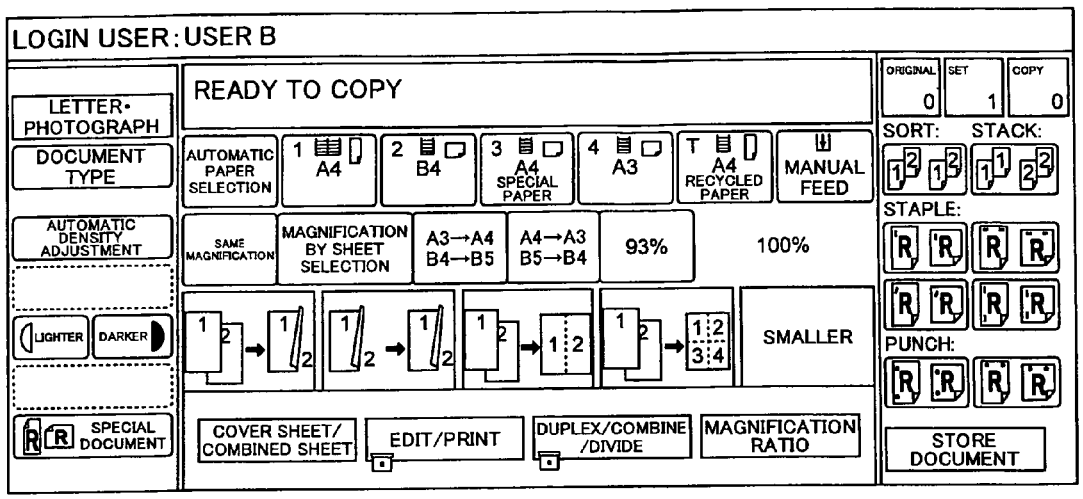
Figure 7E:
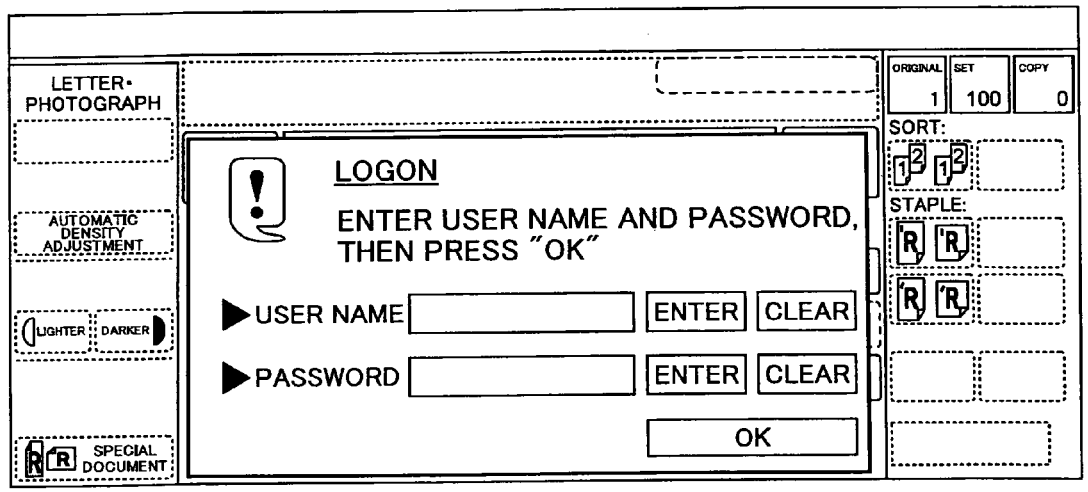

On the screen shown in FIG. 7C, "LOGIN USER: USER B" is displayed at the top. This indicates that the user B having logged into the multifunction peripheral 101 is now assigned with the screen of the operation panel of the multifunction peripheral 101. At this point in time, the copy job requested by the user A is still underway. When the copy job by the user A comes to an end, a screen change occurs so that a screen shown in FIG. 7D appears. On the screen shown in FIG. 7D, "READY TO COPY" is displayed. This indicates that a copy job for the user B can now be executed. In this state of the screen, the logout button 317 (see FIG. 4) is pressed, so that the screen changes into a screen shown in FIG. 7E, with which the multifunction peripheral 101 is in the state of waiting for an input of authentication information. With this, the user B has logged out from the multifunction peripheral 101.

In the login process of the first embodiment, the inputting of authentication information is performed by entering characters (words) representing the authentication information. In the first embodiment, the user B uses the numeric keypad 312, for example, to type in characters (words) representing the authentication information, thereby entering the authentication information into the multifunction peripheral 101. In the login process of the second embodiment, an action of setting the IC card 246 in which authentication information is recorded constitutes the inputting of authentication information. In the login process of the second embodiment, the user B sets the IC card 246 having the authentication information recorded therein into the IC card reader 245, thereby entering the authentication information into the multifunction peripheral 101.

FIG. 8 is a sequence diagram showing the second embodiment of the login process and logout process in the multifunction peripheral 101 shown in FIG. 1.

The user A presses the start button 313 in order to execute a copy job by the multifunction peripheral 101. In response, the OCS 166 informs the SCS 169 of the pressing of the start button 313 (S201). In response, the SCS 169 informs the copy application 141 of the pressing of the start button 313 (S202). In response, the copy application 141 transmits a request to start the copy job to the ECS 164 (S203). The copy job requested by the user A is thus started, so that the process of scanning document copies set in the ADF 321 (FIG. 3) is carried out.

After this, the user B may set the IC card 246 into the IC card reader 245 in an attempt to log into the multifunction peripheral 101. In this case, the OCS 166 informs the SCS 169 of the setting of the IC card 246 (S211). In response, the SCS 169 informs the CCS 167 of the setting of the IC card 246 (S212). In response, the CCS 167 requests the UCS 168 to identify the user B with the authentication information recorded in the IC card 246 (S213). If the user B is properly identified with the authentication information recorded in the IC card 246 (S214), the CCS 167 performs arbitration for the user A's back switch (S215). If the user A's back switch is acceptable (S216), the user A's back switch is distributed (S217). Thereafter, tickets for the user B with the authentication information recorded in the IC card 246 are distributed (S218). Thereafter, the copy application 141 transmits to the OCS 166 a request to display a copy operation screen without the guidance information "READY TO COPY" (S219). As a result, the copy operation screen (FIG. 7C) without the guidance information "READY TO COPY" is displayed.

The process of scanning document copies set in the ADF 321 (FIG. 3) is successively carried out (S204), so that the copy job requested by the user A comes to an end. In response, the ECS 164 transmits to the copy application 141 a response indicative of copy job completion (S205). In response, the copy application 141 transmits to the OCS 166 a request to display the guidance information "READY TO COPY"

(S206). As a result, the copy operation screen (FIG. 7D) with the guidance information "READY TO COPY" is displayed.

It should be noted that a check may be performed between S212 and S213 as to whether the user with the authentication information recorded in the IC card 246 is a login user or not, thereby preventing chattering of the IC card 246. That is, the processes of S213 onwards are performed only when the user B is not a login user. Such a check may be performed by checking whether the user B is the front user by referring to the front user list at a first step and by checking whether the user B is a back user by referring to the back user list at a second step. The processes of S213 onwards will be performed only when the user B is neither the front user nor a back user.

FIGS. 9A through 9F are illustrative drawings showing the transition of screens according to a third embodiment of the login process and logout process in the multifunction peripheral 101 shown in FIG. 1. In the third embodiment, a user A uses the document scan function of the multifunction peripheral 101, and a user B uses the document transmission function of the multifunction peripheral 101.

On the screen shown in FIG. 9A, "LOGIN USER: USER A" is displayed at the top. This indicates that a user A having logged into the multifunction peripheral 101 is now assigned with the screen of the operation panel of the multifunction peripheral 101. Near the top on the screen shown in FIG. 9A, "SCANNING IN PROGRESS" is displayed. This indicates that a document scan job requested by the user A is underway. In this state of the screen, the login button 316 (see FIG. 4) is pressed, so that the screen changes into a screen shown in FIG. 9B, with which the multifunction peripheral 101 is in the state of waiting for an input of authentication information. A user B enters authentication information on the screen shown in FIG. 9B, and touches the OK button, which results in a change into the screen shown in FIG. 9C. With this screen change, the user B has logged into the multifunction peripheral 101.

On the screen shown in FIG. 9C, "LOGIN USER: USER B" is displayed at the top. This indicates that the user B having logged into the multifunction peripheral 101 is now assigned with the screen of the operation panel of the multifunction peripheral 101. At this point in time, the document scan job requested by the user A is still underway. On the screen shown in FIG. 9C, the user B touches a stored document selecting button, which results in a change to a screen shown in FIG. 9D. On the screen shown in FIG. 9D, the user B selects a stored document, and presses the start button 313, which results in the screen changing into a screen shown in FIG. 9E. On the screen shown in FIG. 9E, "TRANSMISSION IN PROGRESS" is displayed. This indicates that a document transmission job requested by the user B is underway. When the document transmission job by the user B comes to an end, the screen returns to the screen shown in FIG. 9C. At this point in time, the document scan job requested by the user A is still underway. In this state of the screen, the logout button 317 (see FIG. 4) is pressed, so that the screen changes into a screen shown in FIG. 9F, with which the multifunction peripheral 101 is in the state of waiting for the inputting of authentication information. With this, the user B has logged out from the multifunction peripheral 101. The user A enters the authentication information on the screen shown in FIG. 9F, and touches the OK button, which results in returning to the screen of FIG. 9A.

On the screen shown in FIG. 9A, "LOGIN USER: USER A" is displayed at the top. This indicates that the user A having logged into the multifunction peripheral 101 is now assigned with the screen of the operation panel of the multifunction peripheral 101. Near the top on the screen shown in FIG. 9A, "SCANNING IN PROGRESS" is displayed. This indicates that the document scan job requested by the user A is still underway.

In the third embodiment, the user A uses the document scan function of the multifunction peripheral 101, and the user B uses the document transmission function of the multifunction peripheral 101. The hardware 111 of the multifunction peripheral 101 used for a document scan job is the imaging unit 121 and the like, and the hardware 111 of the multifunction peripheral 101 used for a document transmission job is the NIC 241 and the like. In this manner, the hardware 111 of the multifunction peripheral 101 used for the document scan job does not overlap the hardware 111 of the multifunction peripheral 101 used for the document transmission job. Because of this, the document scan job by the user A and the document transmission job by the user B are executed in parallel in the third embodiment, and the document transmission job by the user B starts and ends while the document scan job by the user A is underway.

As described above, the hardware 111 of the multifunction peripheral 101 used for a job by a login user who is currently assigned with the screen of the operation panel of the multifunction peripheral 101 may not overlap the hardware 111 of the multifunction peripheral 101 used for a job by another login user who is not currently assigned with the screen of the operation panel of the multifunction peripheral 101. In such a case, the job by the login user who is currently assigned with the screen of the operation panel of the multifunction peripheral 101 and the job by the login user who is not currently assigned with the screen of the operation panel of the multifunction peripheral 101 are executed in parallel.

Figure 10:
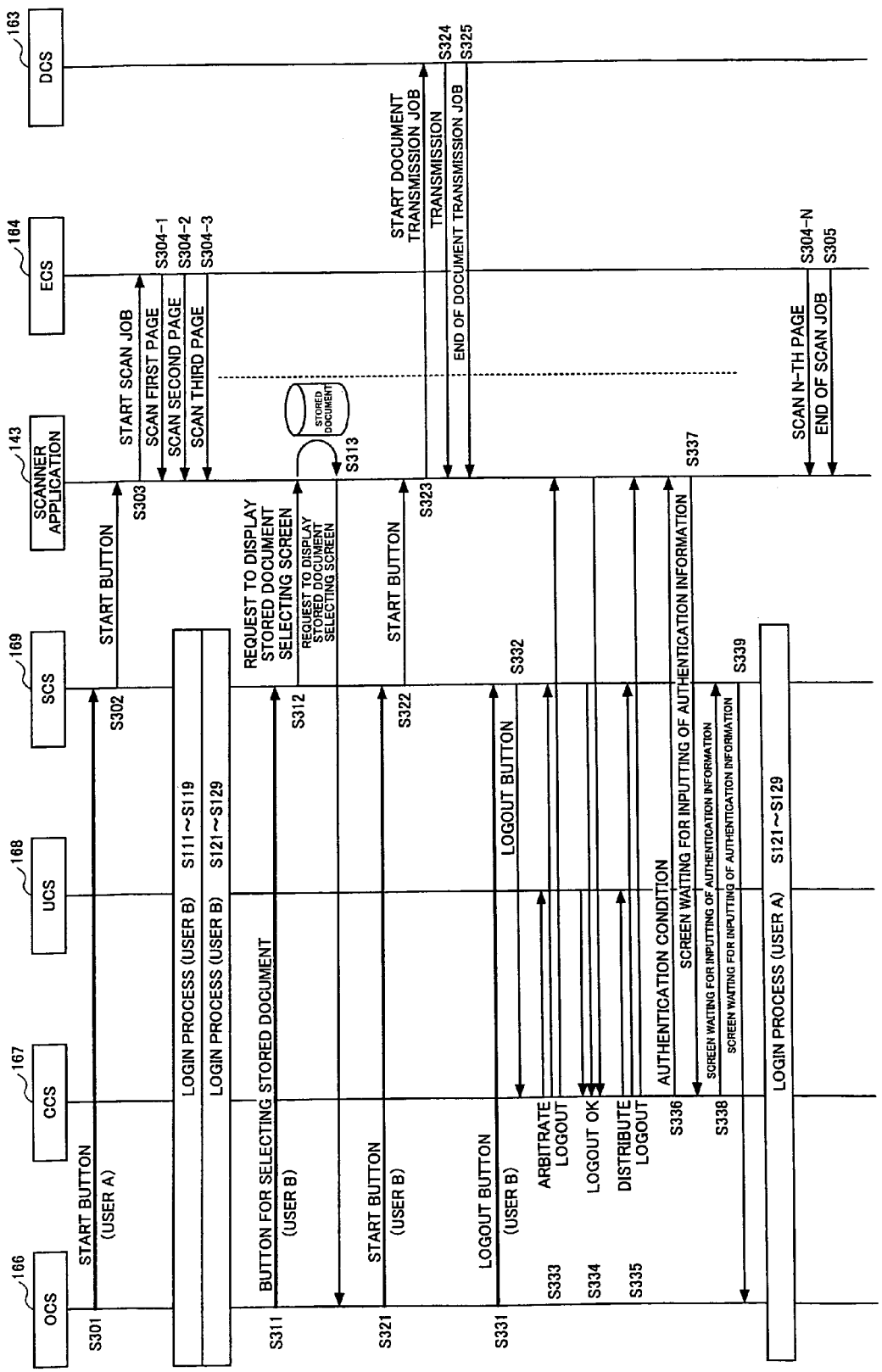
FIG. 10 is a sequence diagram showing the third embodiment of the login process and logout process in the multifunction peripheral shown in FIG. 1.

FIG. 10 is a sequence diagram showing the third embodiment of the login process and logout process in the multifunction peripheral 101 shown in FIG. 1. In the third embodiment, the user A uses the document scan function of the multifunction peripheral 101, and the user B uses the document transmission function of the multifunction peripheral 101.

The user A presses the start button 313 in order to execute a document scan job by the multifunction peripheral 101. In response, the OCS 166 informs the SCS 169 of the pressing of the start button 313 (S301). In response, the SCS 169 informs the scanner application 143 of the pressing of the start button 313 (S302). In response, the scanner application 143 transmits a request to start the document scan job to the ECS 164 (S303). The document scan job requested by the user A is thus started, so that the process of scanning document copies set in the ADF 321 (FIG. 3) is carried out.

After this, the user B may press the login button 316 in an attempt to log into the multifunction peripheral 101. In response, the processes of S111 through S119 (with replacement of the copy application 141 with the scanner application 143) are performed, and the screen waiting for the inputting of authentication information (FIG. 9B) is displayed, with which the multifunction peripheral 101 is placed in the state of waiting for the inputting of authentication information.

Thereafter, the user B enters authentication information, and presses the OK button, resulting in the processes of S121 through S129 being performed (with the replacement of the copy application 141 with the scanner application 143). As a result, the scanner operation screen (FIG. 9C) without the guidance information "READY TO SCAN" is displayed.

After this, the user B presses a stored document selecting button. In response, the OCS 166 informs the SCS 169 of the pressing of the stored document selecting button (S311). In response, the SCS 169 transmits to the scanner application 143 a request to display a stored document selecting screen (S312). In response, the scanner application 143 transmits to the OCS 166 a request to display a stored document selecting screen (S313). As a result, the stored document selecting screen (FIG. 9D) is displayed.

After this, the user B selects a stored document, and presses the start button 313 in order to execute a document transmission job by the multifunction peripheral 101. In response, the OCS 166 informs the SCS 169 of the pressing of the start button 313 (S321). In response, the SCS 169 informs the scanner application 143 of the pressing of the start button 313 (S322). In response, the scanner application 143 transmits a request to start the document transmission job to the DCS 163 (S323). The document transmission job requested by the user B is thus started, so that the transmission of the stored document selected on the stored document selecting screen is carried out (S324). When the document transmission job by the user B comes to an end after performing the transmission of the stored document selected on the stored document selecting screen (S324), the DCS 163 sends to the scanner application 143 a response indicative of the completion of the document transmission job (S325).

After this, the user B may press the logout button 317 in an attempt to log out from the multifunction peripheral 101. The OCS 166 informs the SCS 169 of the pressing of the logout button 317 (S331). In response, the SCS 169 informs the CCS 167 of the pressing of the logout button 317 (S332). In response, the CCS 167 performs arbitration for the user B's logout (S333). If the user B's logout is acceptable (S334), the user B's logout is distributed (S335). Thereafter, the CCS 167 informs the scanner application 143 of the authentication conditions (S336). In response, the scanner application 143 transmits to the CCS 167 a request to display a screen waiting for the inputting of authentication information (S337). In response, the CCS 167 transmits to the SCS 169 a request to display a screen waiting for the inputting of authentication information (S338). In response, the SCS 169 transmits to the OCS 166 a request to display a screen waiting for the inputting of authentication information (S339). As a result, the screen waiting for the inputting of authentication information (FIG. 9F) is displayed, placing the multifunction peripheral 101 in the state of waiting for the inputting of authentication information.

Thereafter, the user A enters authentication information, and presses the OK button. This results in the processes of S121 through S129 being performed (with the replacement of the copy application 141 with the scanner application 143), thereby displaying the scanner operation screen (FIG. 9A) with the guidance information "SCANNING IN PROGRESS".

In the multifunction peripheral 101 shown in FIG. 1, the CCS 167 performs the login process and logout process as performed in the first embodiment, the second embodiment, and the third embodiment. In the following, various processes relevant to the login process and logout process will be described.

Figure 11A:
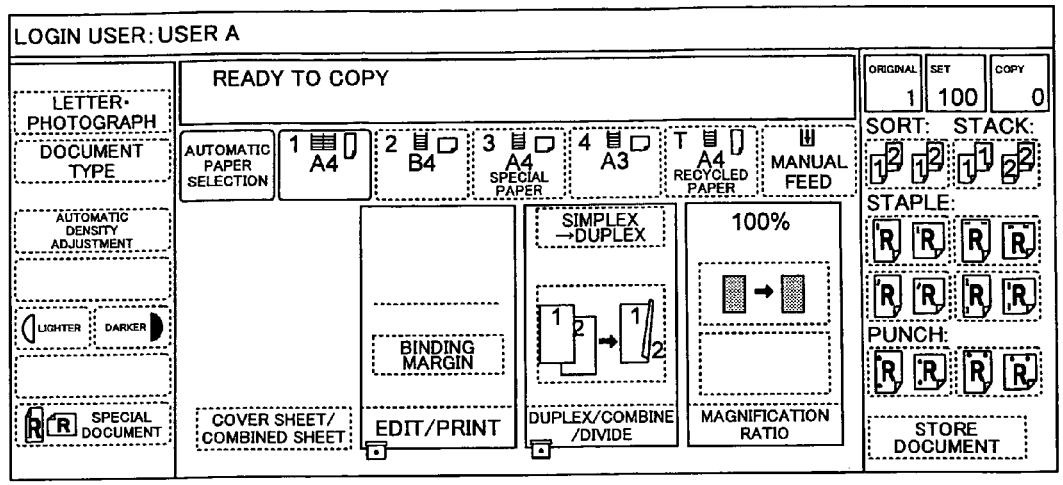
FIGS. 11A through 11C are illustrative drawings showing the transition of screens relating to a front user switching operation screen.
Figure 11B:
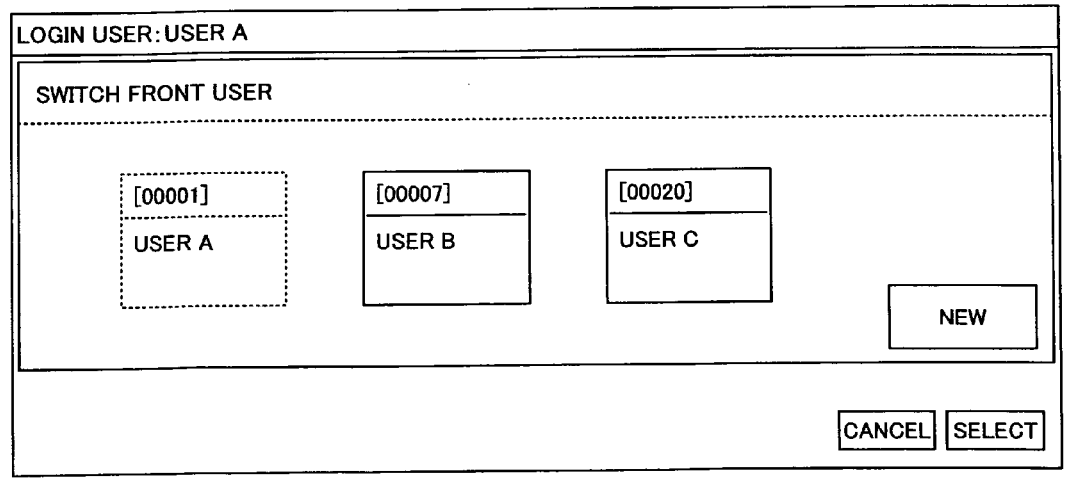
Figure 11C:
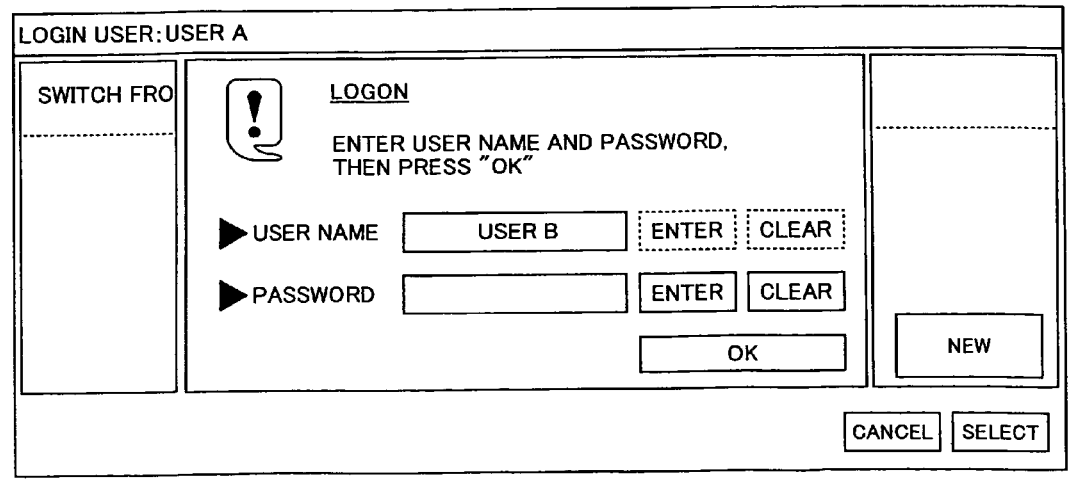

FIGS. 11A through 11C are illustrative drawings showing the transition of screens relating to a front user switching operation screen. The switching operation screen shown in the figures is used to change the login user (front user) who is assigned with the screen of the operation panel of the multifunction peripheral 101. This screen is provided by the SCS 169 based on the back user list that is managed by the CCS 167.

On the screen shown in FIG. 11A, "LOGIN USER: USER A" is displayed at the top. This indicates that the user A having logged into the multifunction peripheral 101 is now assigned with the screen of the operation panel of the multifunction peripheral 101. In this state of the screen, the login button 316 is pressed, which results in the screen changing into a screen shown in FIG. 11B. On the screen (switch operation screen) shown in FIG. 11B, "USER A" who is the front user is displayed in halftone, and "USER B" and "USER C" who are back users are displayed in darker tone. If "USER B" is touched on the screen shown in FIG. 11B, the screen changes into a screen shown in FIG. 11C, with which the multifunction peripheral 101 is placed in the state of waiting for the inputting of authentication information. The entry field of the screen shown in FIG. 11C already has "USER B" displayed as a default input so as to select the user B as the front user as indicated by the touch on the screen shown in FIG. 11B.

It should be noted that the screen shown in FIG. 11B may not present "USER A" who is the front user. Further, an authentication process associated with the screen shown in FIG. 11C may be performed by using regular authentication or by using simplified authentication requiring only a password.

FIG. 12 is a sequence diagram relating to the front user switching operation screen.

In response to the pressing of the login button 316, the OCS 166 informs the SCS 169 of the pressing of the login button 316 (S401). In response, the SCS 169 transmits to the CCS 167 a request to supply a back user list (S402). In response, the CCS 167 supplies a back user list to the SCS 169 (S403). In response, the SCS 169 transmits to the OCS 166 a request to display a front user switching operation screen (S404). As a result, the front user switching operation screen (FIG. 11B) is displayed.

Thereafter, "USER B" who is one of the back users is pressed, resulting in the OCS 166 informing the SCS 169 of the pressing of the back user "USER B" (S411). In response, the SCS 169 informs the CCS 167 of the pressing of the back user "USER B" (S412). In response, the CCS 167 performs arbitration for the back switch of the front user "USER A" (S413). If the back switch of the front user "USER A" is acceptable (S414), the back switch of the front user "USER A" is distributed (S415). After this, the CCS 167 informs the copy application 141 of authentication conditions (S416). In response, the copy application 141 transmits to the CCS 167 a request to display a screen waiting for the inputting of authentication information (S417). In response, the CCS 167 transmits to the SCS 169 a request to display a screen waiting for the inputting of authentication information (S418). In response, the SCS 169 transmits to the OCS 166 a request to display a screen waiting for the inputting of authentication information (S419). As a result, the screen waiting for the inputting of authentication information (FIG. 11C) is displayed, placing the multifunction peripheral 101 in the state of waiting for the inputting of authentication information.

Figure 13A:
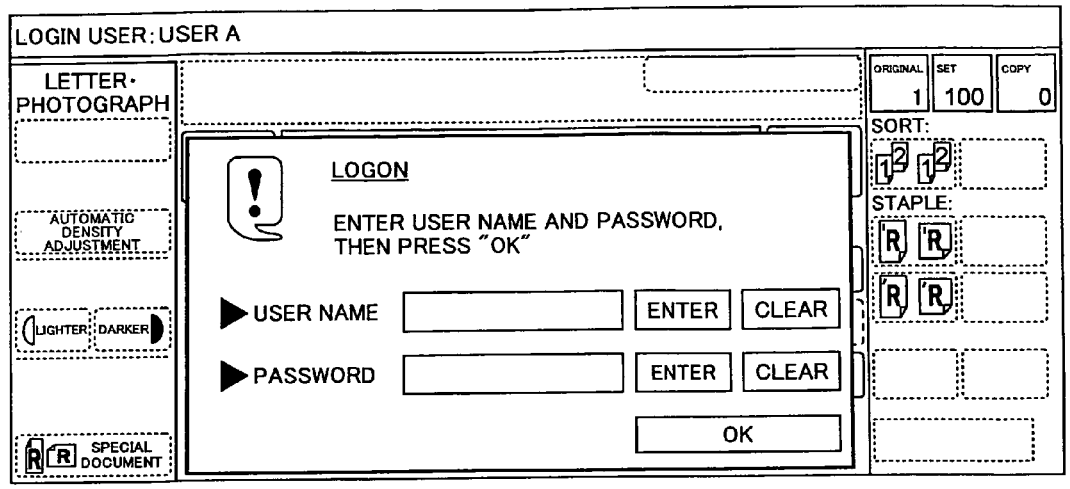
FIGS. 13A through 13C are illustrative drawings showing the transition of screens relating to a back user logout operation screen.
Figure 13B:
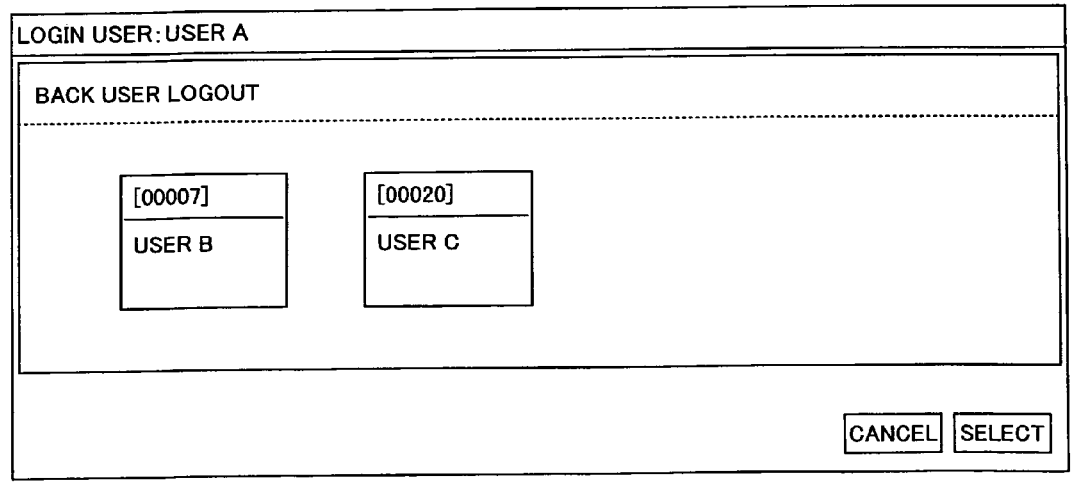
Figure 13C:
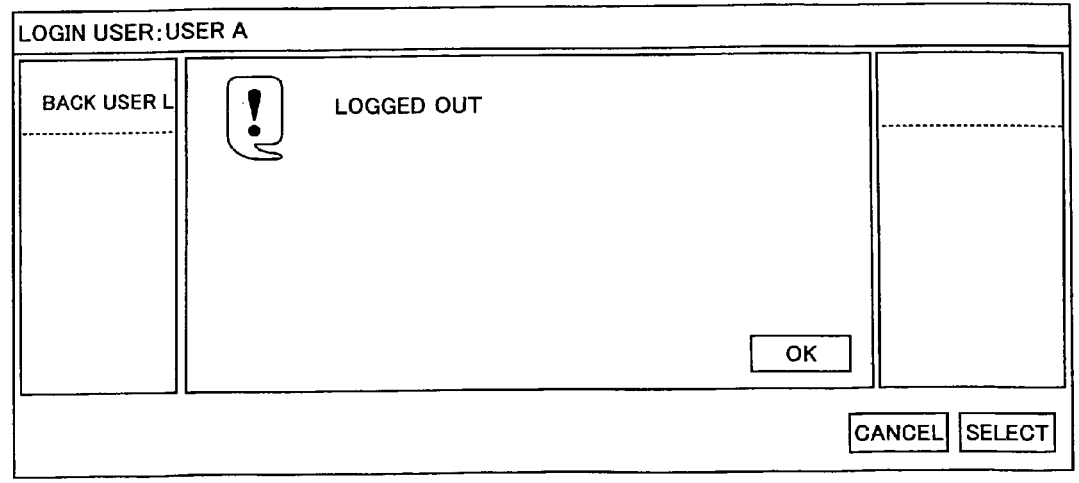

FIGS. 13A through 13C are illustrative drawings showing the transition of screens relating to a back user logout operation screen. The logout operation screen shown in the figures is used to let a login user logout when this login user is not assigned with the screen of the operation panel of the multifunction peripheral 101. This screen is provided by the SCS 169 based on the back user list that is managed by the CCS 167.

A screen shown in FIG. 13A is a screen that waits for an input of authentication information. In this state of the screen, the logout button 317 is pressed, resulting in the screen changing into a screen shown in FIG. 13B. On the screen (logout operation screen) shown in FIG. 13B, "USER B" and "USER C" who are back users are displayed in dark tone. If "USER B" is touched on the screen of FIG. 13B, the screen changes into a screen shown in FIG. 13C. With this, the user B logs out as requested by the touch on the screen of FIG. 13B. When the OK button is touched on the screen shown in FIG. 13C, the screen display returns to the screen of FIG. 13A, with which the multifunction peripheral 101 is placed in the state of waiting for the inputting of authentication information.

FIG. 14 is a sequence diagram relating to the back user logout operation screen.

In response to the pressing of the logout button 317, the OCS 166 informs the SCS 169 of the pressing of the logout button 317 (S501). In response, the SCS 169 transmits to the CCS 167 a request to supply a back user list (S502). In response, the CCS 167 supplies a back user list to the SCS 169 (S503). In response, the SCS 169 transmits to the OCS 166 a request to display a back user logout operation screen (S504). As a result, the back user logout operation screen (FIG. 13B) is displayed.

Thereafter, "USER B" who is one of the back users is pressed, resulting in the OCS 166 informing the SCS 169 of the pressing of the back user "USER B" (S511). In response, the SCS 169 informs the CCS 167 of the pressing of the back user "USER B" (S512). In response, the CCS 167 performs arbitration for the logout of the back user "USER B" (S513). If the logout of the back user "USER B" is acceptable (S514), the logout of the back user "USER B" is distributed (S515). After this, the CCS 167 informs the copy application 141 of authentication conditions (S516). In response, the copy application 141 transmits to the CCS 167 a request to display a confirmation screen (S517). In response, the CCS 167 transmits to the SCS 169 a request to display a confirmation screen (S518). In response, the SCS 169 transmits to the OCS 166 a request to display a confirmation screen (S519). As a result, the confirmation screen (FIG. 13C) is displayed.

Thereafter, the confirmation button (OK button) is pressed. In response, the OCS 166 informs the SCS 169 of the pressing of the OK button (S521). In response, the SCS 169 informs the CCS 167 of the pressing of the OK button (S522). In response, the CCS 167 transmits to the SCS 169 a request to display a screen waiting for the inputting of authentication information (S523). In response, the SCS 169 transmits to the OCS 166 a request to display a screen waiting for the inputting of authentication information (S524). As a result, the screen waiting for the inputting of authentication information (FIG. 13A) is displayed, placing the multifunction peripheral 101 in the state of waiting for the inputting of authentication information.

Figure 15A:
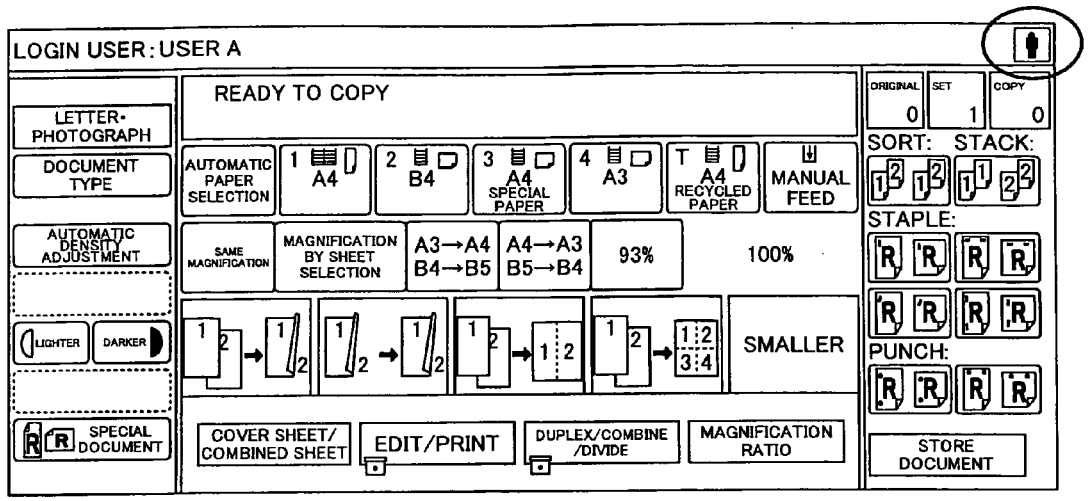
FIGS. 15A through 15H are illustrative drawings for explaining back user icons.
Figure 15B:
Figure 15C:
Figure 15D:
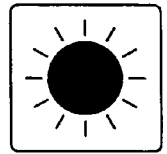
Figure 15E:
Figure 15F:
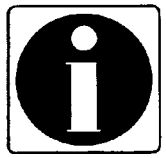
Figure 15G:
Figure 15H:
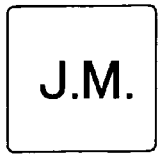

FIGS. 15A through 15H are illustrative drawings for explaining back user icons. When there are back users, the presence of the back users may be indicated by use of an icon on the screen of the operation panel of the multifunction peripheral 101 as shown by an encircled portion on the screen of FIG. 15A. The icon may be the same for two or more users, or may be unique to each user. FIGS. 15B and 15C show examples of icons that are the same for two or more users. FIGS. 15D through 15H illustrate examples of icons that are unique to respective users. FIG. 15G shows an example of an icon that includes the name of a user. FIG. 15H shows an example of an icon that includes the initials of a user. Icons assigned to respective users may be determined in advance.

FIGS. 16A and 16B are illustrative drawings for explaining a back user's timeout. As shown in FIGS. 16A and 16B, each back user may automatically be forced to logout after the passage of a predetermined time period. FIGS. 16A and 16B illustrate the way the back user "USER C" is automatically forced to logout after the passage of a predetermined time period. FIG. 16A corresponds to the screen before the timeout, and FIG. 16B corresponds to the screen after the timeout. The logout of a back user may be performed upon the passage of a predetermined time period (e.g. one hour) following the back switch of the back user. In this case, the CCS 167 transmits a request to start a timer to the SCS 169 at the time of the back switch, for example. After the passage of a predetermined time, the SCS 169 informs the CCS 167.

Figure 17A:
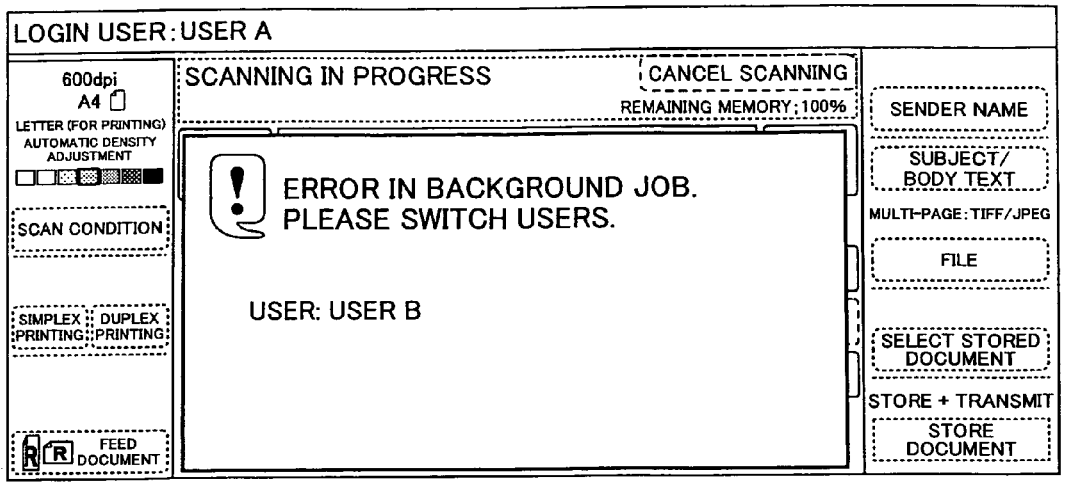
Figure 17B:
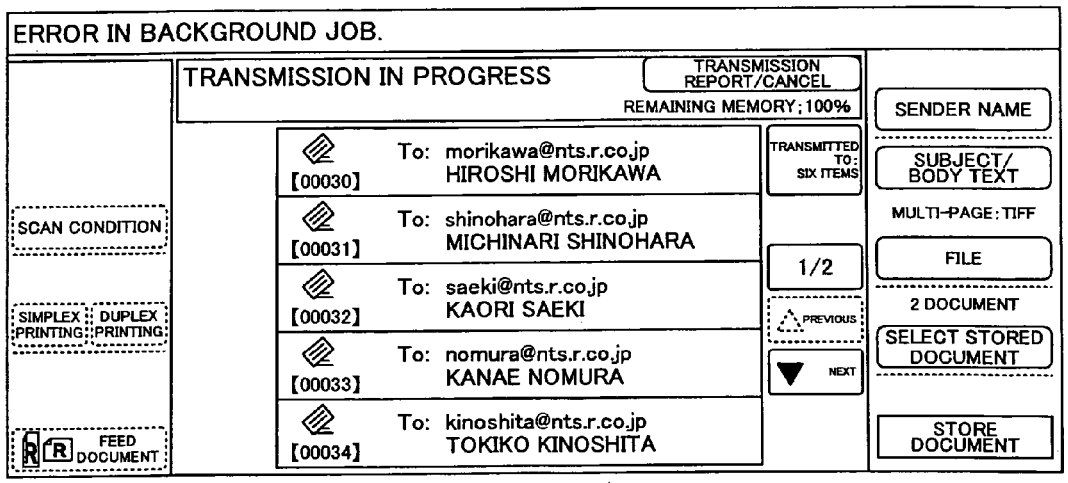
Figure 17C:
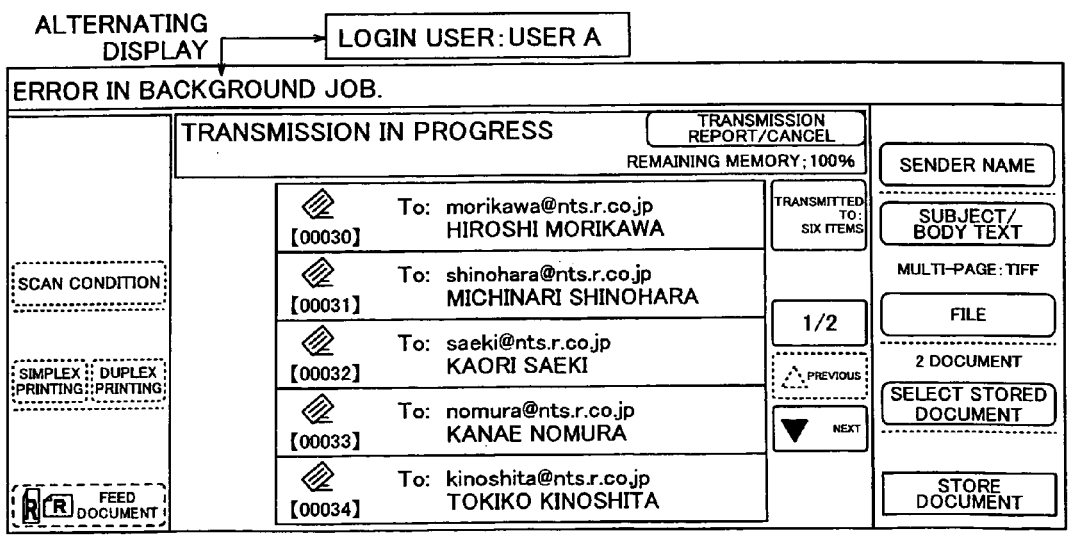

FIGS. 17A through 17F are illustrative drawings for explaining the notification of a back user job error. When an error occurs with respect to a back user job, the back user job error may be reported to the front user by use of the screen of the operation panel of the multifunction peripheral 101 as shown in FIGS. 17A through 17D. FIG. 17A shows an example in which a window is used for notification. FIG. 17B shows an example in which a message bar is used for notification. When a message bar is used, the user name of the front user "USER A" may be alternately displayed as shown in FIG. 17C. Further, the user name of the relevant back user "USER B" may be simultaneously displayed as shown in FIG. 17D. When an error occurs in a back user job, the back user job error may be reported by use of email or the alarm lamp 320 (see FIG. 4). When email is used, the fact that email is used may be indicated by use of the message bar as shown in FIG. 17E.

A notification setting screen shown in FIG. 17F may be used to control whether a back user job error is reported. The notification setting screen shown in FIG. 17F provides for a setting to be made as to whether a back user job error is to be reported, and also provides for a setting to be made as to whether a back user job error is to be reported by use of a screen, to be reported by use of email, or to be reported by use of the alarm lamp. A setting field F1 is used for the across-the-board setting, and setting fields F2 through F4 are used for the individual settings. The SCS 169 provides this notification setting screen, and manages the notification settings made on the notification setting screen.

If a jam, as an example of a back user job error, occurs, the occurrence of the jam is reported from an engine unit such as the imaging unit 121 or the printing unit 122 to the ECS 164, then reported from the ECS 164 to the applications 131, and further reported from the applications 131 to the SCS 169. The SCS 169 reports the occurrence of the back user job error by use of the screen, email, or/and the alarm lamp.

Figure 18A:
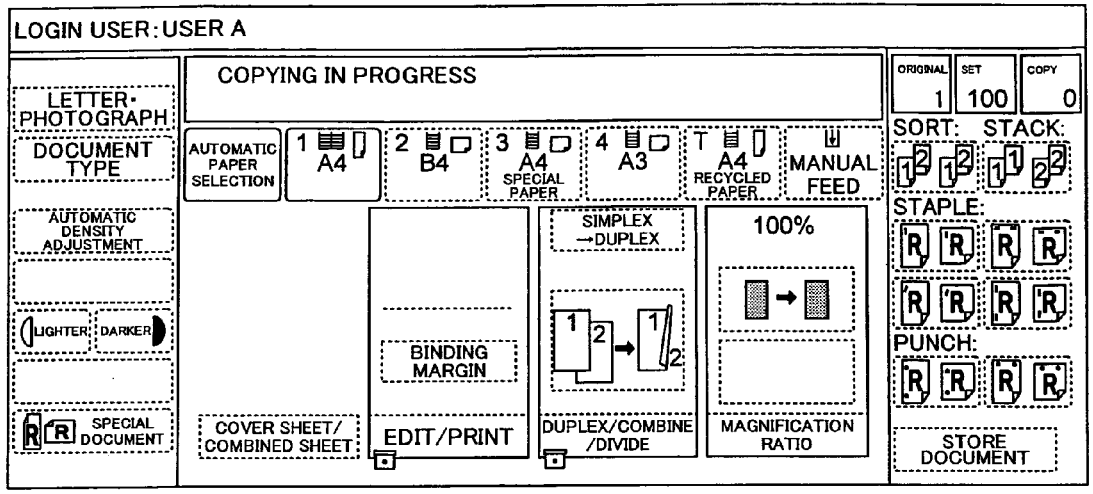
FIGS. 18A and 18B are illustrative drawings showing the transition of screens relating to the back switch (first example) of the front user following the completion of the front user's job.
Figure 18B:
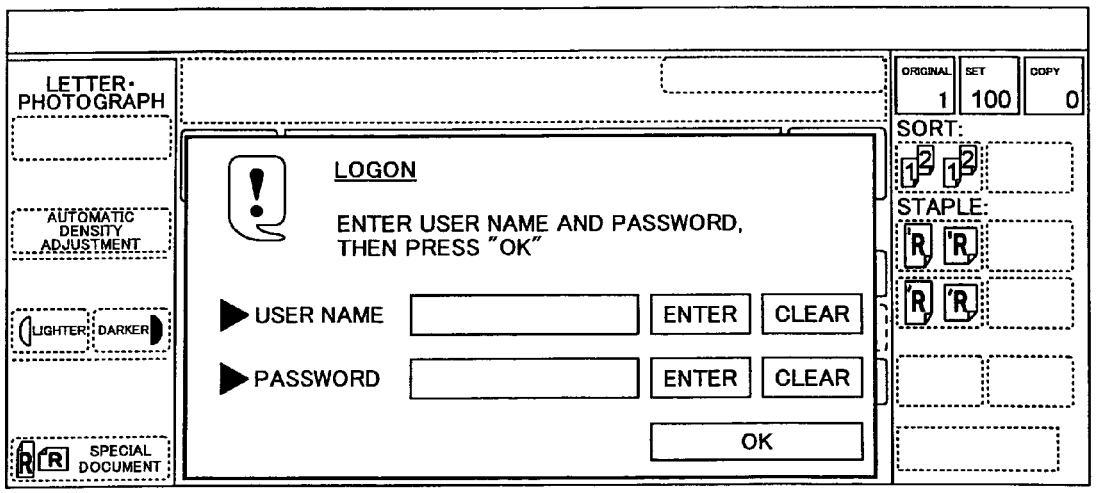

FIGS. 18A and 18B are illustrative drawings showing the transition of screens relating to the back switch (first example) of the front user following the completion of the front user's job.

On the screen shown in FIG. 18A, "LOGIN USER: USER A" is displayed at the top. This indicates that a user A having logged into the multifunction peripheral 101 is now assigned with the screen of the operation panel of the multifunction peripheral 101. Near the top on the screen shown in FIG. 18A, "COPYING IN PROGRESS" is displayed. This indicates that a copy job requested by the user A is underway. When the user A's copy job comes to an end, the user A is automatically back-switched, and the screen changes into a screen shown in FIG. 18B, with which the multifunction peripheral 101 is placed in the state of waiting for the inputting of authentication information.

FIG. 19 is a sequence diagram showing the back switch of the front user following the completion of the front user's job.

The user A presses the start button 313 in order to execute a copy job by the multifunction peripheral 101. In response, the OCS 166 informs the SCS 169 of the pressing of the start button 313 (S601). In response, the SCS 169 informs the copy application 141 of the pressing of the start button 313 (S602). In response, the copy application 141 transmits a request to start the copy job to the ECS 164 (S603). The copy job requested by the user A is thus started, so that the process of scanning document copies set in the ADF 321 (FIG. 3) is carried out. The process of scanning document copies set in the ADF 321 (FIG. 3) is successively carried out (S604), so that the copy job requested by the user A comes to an end. In response, the ECS 164 transmits to the copy application 141 a response indicative of copy job completion (S605). In response, the copy application 141 transmits to the CCS 167 a request to back-switch the user A (S606). In response, the processes (the back-switching of the user A) of S113 through S119 are performed, resulting in the screen waiting for the inputting of authentication information (FIG. 18B) being displayed.

FIGS. 20A through 20D are illustrative drawings showing the transition of screens relating to the back switch (second example) of the front user following the completion of the front user's job.

Figure 20A:
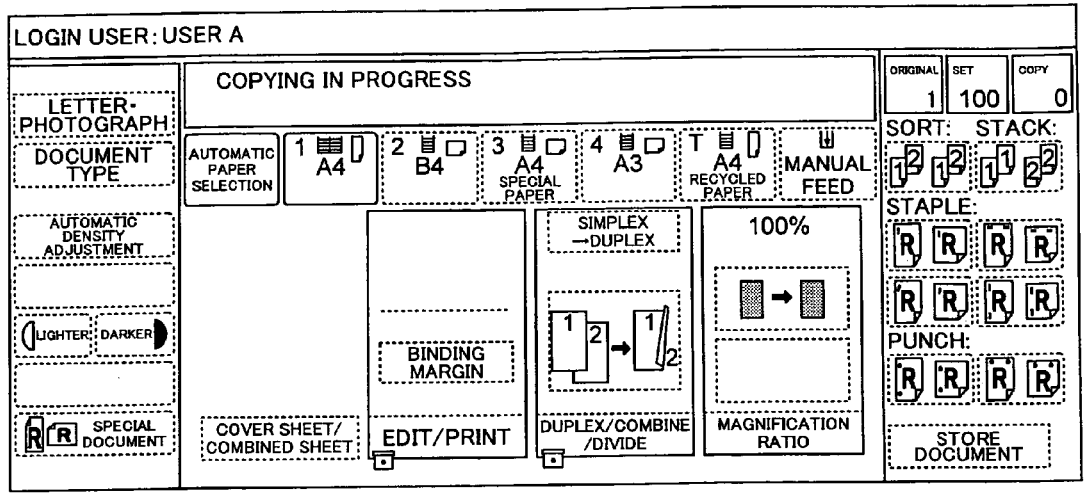
FIGS. 20A through 20D are illustrative drawings showing the transition of screens relating to the back switch (second example) of the front user following the completion of the front user's job.
Figure 20B:
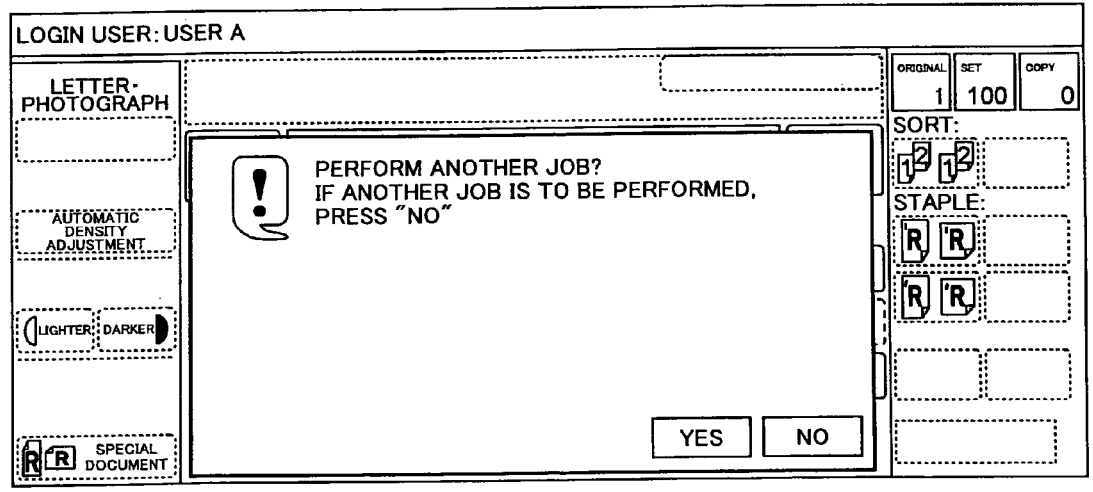
Figure 20C:
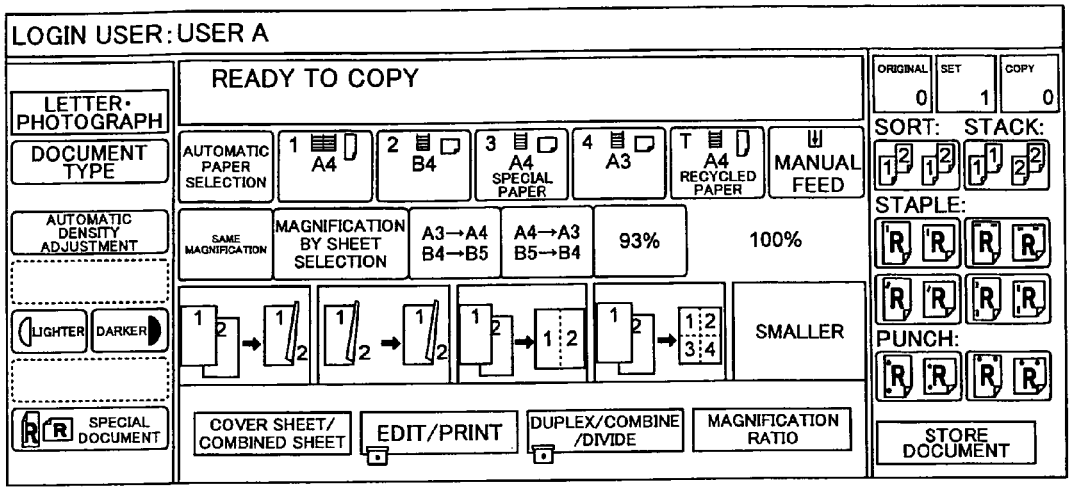
Figure 20D:
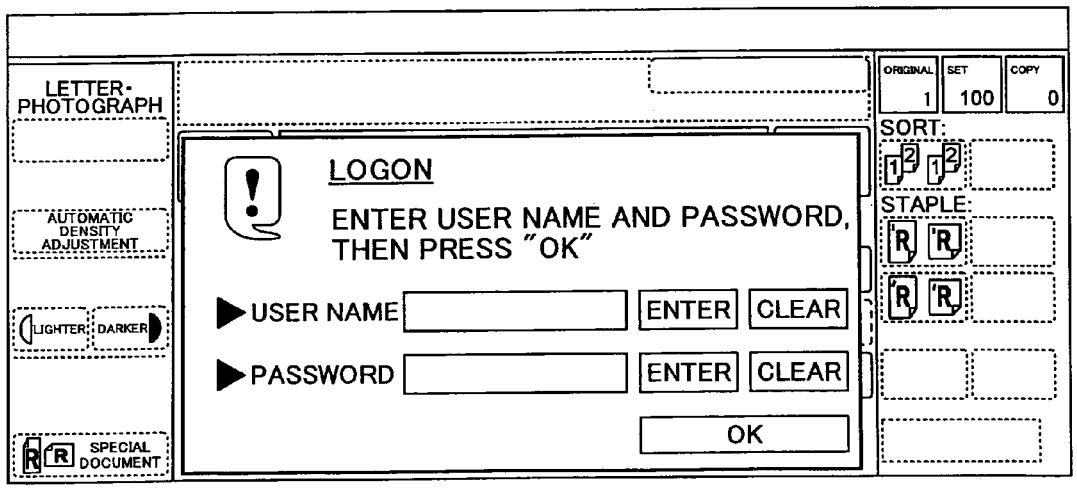

On the screen shown in FIG. 20A, "LOGIN USER: USER A" is displayed at the top. This indicates that a user A having logged into the multifunction peripheral 101 is now assigned with the screen of the operation panel of the multifunction peripheral 101. Near the top on the screen shown in FIG. 20A, "COPYING IN PROGRESS" is displayed. This indicates that a copy job requested by the user A is underway. When the user A's copy job comes to an end, the screen automatically changes into a screen shown in FIG. 20B. If the user A touches "YES" on the screen shown in FIG. 20B, the user A is not forced to back-switch, and the screen changes to a screen shown in FIG. 20C. If the user A touches "NO" on the screen shown in FIG. 20B, the user A is forced to back-switch, and the screen changes to a screen shown in FIG. 20D, with which the multifunction peripheral 101 is placed in the state of waiting for the inputting of authentication information. As described here, FIG. 20B illustrates the back switch operation screen (back switch operation window) for back-switching the user A.

FIG. 21 is a sequence diagram showing the back switch of the front user following the completion of the front user's job.

The user A presses the start button 313 in order to execute a copy job by the multifunction peripheral 101. In response, the OCS 166 informs the SCS 169 of the pressing of the start button 313 (S701). In response, the SCS 169 informs the copy application 141 of the pressing of the start button 313 (S702). In response, the copy application 141 transmits a request to start the copy job to the ECS 164 (S703). The copy job requested by the user A is thus started, so that the process of scanning document copies set in the ADF 321 (FIG. 3) is carried out. The process of scanning document copies set in the ADF 321 (FIG. 3) is successively carried out (S704), so that the copy job requested by the user A comes to an end. In response, the ECS 164 transmits to the copy application 141 a response indicative of copy job completion (S705). In response, the copy application 141 transmits to the OCS 166 a request to display a back switch operation screen (S706). As a result, the back switch operation screen (FIG. 20B) is displayed.

If the user A presses "NO", the OCS 166 informs the SCS 169 of the pressing of "NO" (S711). In response, the SCS 169 informs the copy application 141 of the pressing of "NO" (S712). In response, the copy application 141 transmits to the CCS 167 a request to back-switch the user A (S713). In response, the processes (the back-switching of the user A) of S113 through S119 are performed, resulting in the screen waiting for the inputting of authentication information (FIG. 20D) being displayed.

Figure 22A:
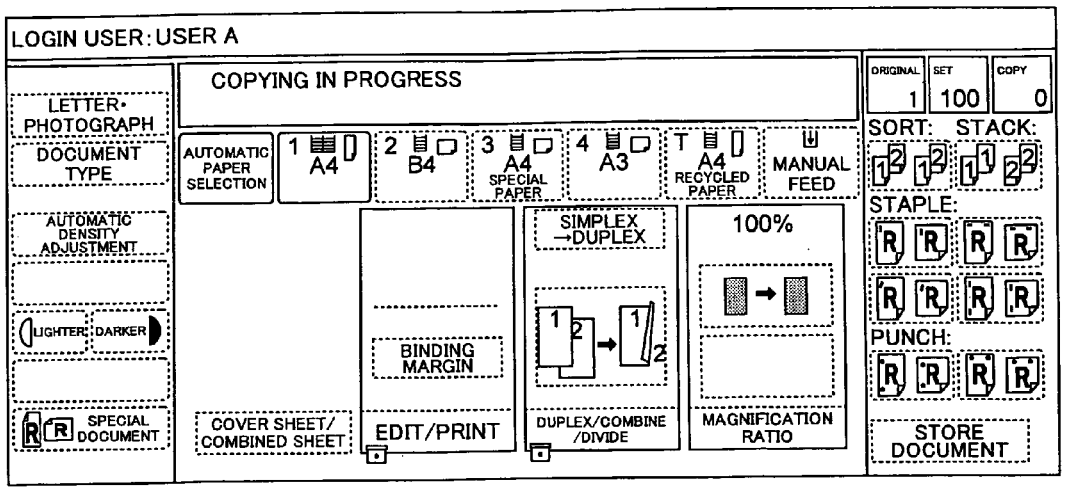
FIGS. 22A through 22C are illustrative drawings showing the transition of screens relating to the back switch (third example) of the front user following the completion of the front user's job.
Figure 22B:
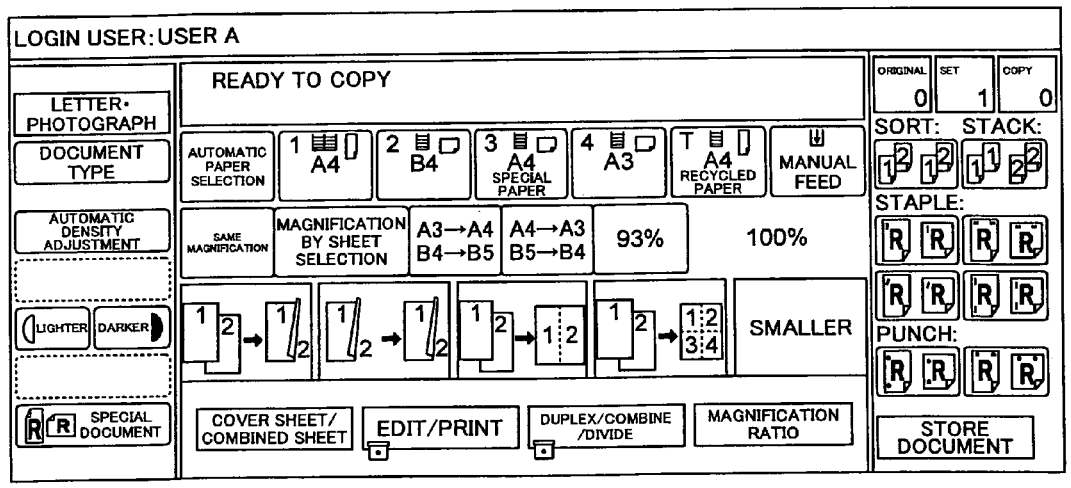
Figure 22C:
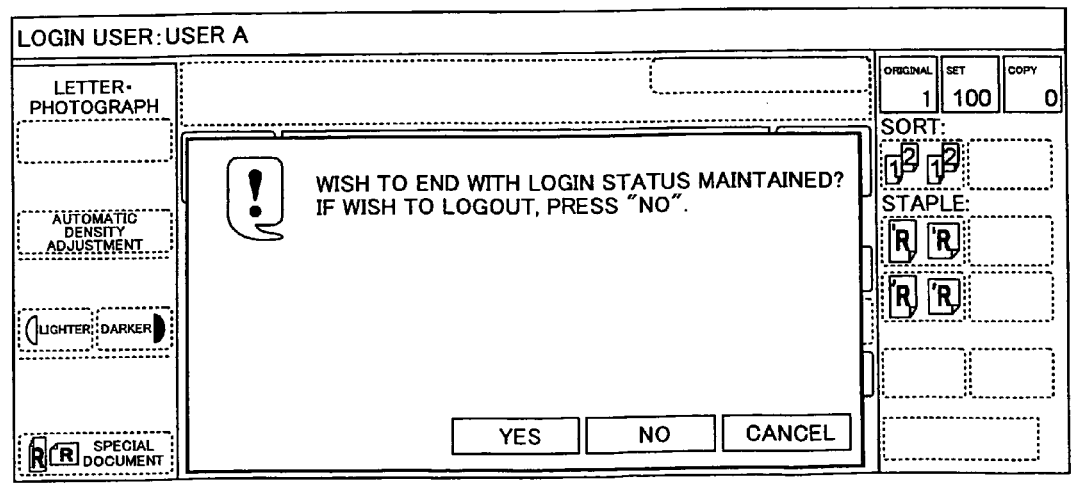

FIGS. 22A through 22C are illustrative drawings showing the transition of screens relating to the back switch (third example) of the front user following the completion of the front user's job.

On the screen shown in FIG. 22A, "LOGIN USER: USER A" is displayed at the top. This indicates that a user A having logged into the multifunction peripheral 101 is now assigned with the screen of the operation panel of the multifunction peripheral 101. Near the top on the screen shown in FIG. 22A, "COPYING IN PROGRESS" is displayed. This indicates that a copy job requested by the user A is underway. When the user A's copy job comes to an end, the screen changes to a screen shown in FIG. 22B. On the screen shown in FIG. 22B, "LOGIN USER: USER A" is displayed at the top. This indicates that the user A having logged into the multifunction peripheral 101 has assigned thereto the screen of the operation panel of the multifunction peripheral 101. Near the top on the screen shown in FIG. 22B, "READY TO COPY" is displayed. This indicates that a copy job can now be executed for the user A. In this state of the screen, the logout button 317 may be pressed, which results in the screen changing into a screen shown in FIG. 22C. If the user A touches "YES" on the screen shown in FIG. 22C, the user A is forced to back-switch. If the user A touches "NO" on the screen shown in FIG. 22C, the user A is forced to logout.

FIG. 23 is a sequence diagram showing the back switch of the front user following the completion of the front user's job.

The user A presses the start button 313 in order to execute a copy job by the multifunction peripheral 101. In response, the OCS 166 informs the SCS 169 of the pressing of the start button 313 (S801). In response, the SCS 169 informs the copy application 141 of the pressing of the start button 313 (S802). In response, the copy application 141 transmits a request to start the copy job to the ECS 164 (S803). The copy job requested by the user A is thus started, so that the process of scanning document copies set in the ADF 321 (FIG. 3) is carried out. The process of scanning document copies set in the ADF 321 (FIG. 3) is successively carried out (S804), so that the copy job requested by the user A comes to an end. In response, the ECS 164 transmits to the copy application 141 a response indicative of copy job completion (S805). In response, the copy application 141 transmits to the OCS 166 a request to display a copy operation screen with the guidance information "READY TO COPY" (S806) As a result, the copy operation screen (FIG. 22B) with the guidance information "READY TO COPY" is displayed.

Thereafter, the user A presses the logout button 317 in an attempt to log out from the multifunction peripheral 101. In response, the OCS 166 informs the SCS 169 of the pressing of the logout button 317 (S811). In response, the SCS 169 informs the CCS 167 of the pressing of the logout button 317 (S812). In response, the CCS 167 transmits to the SCS 169 a request to display a logout operation screen (S813). In response, the SCS 169 transmits to the OCS 166 a request to display a logout operation screen (S814). As a result, the logout operation screen (FIG. 22C) is displayed.

If the user A presses "NO", the OCS 166 informs the SCS 169 of the pressing of "NO" (S821). In response, the SCS 169 informs the CCS 167 of the pressing of "NO" (S822). In response, the processes (the back-switching of the user A) of S113 through S119 are performed, resulting in the screen waiting for the inputting of authentication information being displayed.

The multifunction peripheral 101 may be configured such that the front user (the login user who is currently assigned with the screen of the operation panel of the multifunction peripheral 101) is changed into a back user (a login user who is not assigned with the screen of the operation panel of the multifunction peripheral 101) by use of a switching action as in the first through third examples described above. In such a case, the user B may enter authentication information on the screen waiting for the inputting of authentication information that is displayed after the back-switching of the user A. With this, the front user who has assigned thereto the screen of the operation panel of the multifunction peripheral 101 changes from the user A to the user B.

Figure 24:
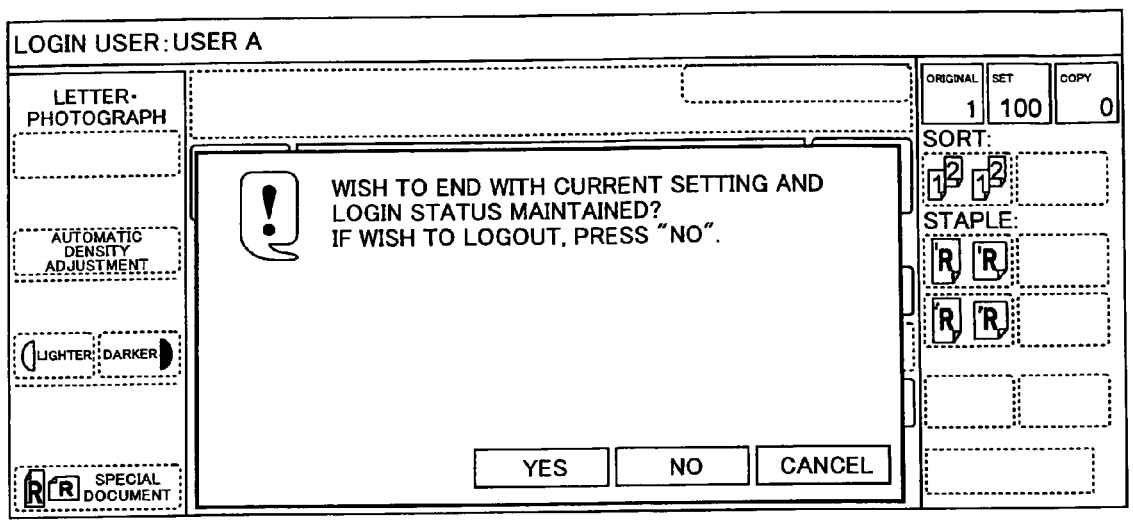
FIG. 24 is an illustrative drawing showing an example of a preference checking screen.

User settings of the user who is moved from the front user to a back user are managed by the applications 131. When the user is back-switched, the applications 131 keep the user settings in response to the distribution of the back switch of the user (S115). When the user is front-switched, the applications 131 retrieve the user settings in response to the distribution of the user ticket (S125). The user settings of the user who is moved from the front user to a back user may be maintained regardless of the user's preference, or may be maintained according to user preference given on a preference checking screen as shown in FIG. 24.

[Variation]

The multifunction peripheral 101 shown in FIG. 1 corresponds to an embodiment of the information processing apparatus of the present invention. Information processing performed by the multifunction peripheral 101 shown in FIG. 1 corresponds to an embodiment of the information processing method of the present invention. A computer program causing a computer to perform such information processing corresponds to an embodiment of the information processing program of the present invention. A CD-ROM that has such a computer program recorded therein corresponds to an embodiment of the record medium of the present invention.

Further, the present invention is not limited to these embodiments, but various variations and modifications may be made without departing from the scope of the present invention.

The present application is based on Japanese priority application No. 2004-115836 filed on Apr. 9, 2004, with the Japanese Patent Office, the entire contents of which are hereby incorporated by reference.

What is claimed is:

1. An information processing apparatus, which accepts an operating instruction from a user who has logged into the information processing apparatus and is assigned to input information into a display screen on the information processing apparatus, comprising:

the display screen;

a login processing unit configured to allow multi-user logins of at least first and second users, and to allow the first user to login and be assigned the screen to input information into the screen and to allow a switchover of assigning the screen to the second user to allow the second user, after the first user, to login and be assigned the screen to input information into the screen, while maintaining a login status of the first user, wherein the login processing unit is configured to allow the first and second users who are logged-in users to switch between a front user status and a back user status, such that a logged-in user given the front user status is allowed to input information into the screen while a logged-in user given the back user status is not allowed to input information into the screen, wherein after the first user logs in and is assigned the front user status to input information into the screen, the information processing apparatus performs a job of the first user, which job of the first user is a job executed by application software, and wherein the login processing unit further detects completion of the job of the first user executed by application software, and upon detecting the completion of the job of the first user executed by application software automatically changes a status of the first user to the back user status to not be assigned to input information into the screen, and automatically without user intervention changes the screen into a logon state screen waiting for input of authentication information.

2. An information processing apparatus, which accepts an operating instruction from a user who has logged into the information processing apparatus and is assigned to input information into a display screen on the information processing apparatus, comprising:

the display screen;

a login processing unit configured to allow multi-user logins of at least first and second users, and to allow the first user to login and be assigned the screen to input information into the screen and to allow a switchover of assigning the screen to the second user to allow the second user, after the first user, to login and be assigned the screen to input information into the screen, while maintaining a login status of the first user, wherein the login processing unit is configured to allow the first and second users who are logged-in users to switch between a front user status and a back user status, such that a logged-in user given the front user status is allowed to input information into the screen while a logged-in user given the back user status is not allowed to input information into the screen, wherein after the first user logs in and is assigned to the front user status input information into the screen, the information processing apparatus performs a job of the first user, which job of the first user is a iob executed by application software, and wherein the login processing unit further detects completion of the job of the first user executed by application software, and upon detecting the completion of the job of the first user executed by application software automatically changes the screen into a screen allowing the first user to select performing another job or to change a status of the first user to the back user status to not be assigned to input information into the screen, and automatically without user intervention switches to a logon state screen waiting for input of authentication information.

3. An information processing apparatus, which accepts an operating instruction from a user who has logged into the information processing apparatus and is assigned to input information into a display screen on the information processing apparatus, comprising:

the display screen;

a login processing unit configured to allow multi-user logins of at least first and second users, and to allow the first user to login and be assigned the screen to input information into the screen and to allow a switchover of assigning the screen to the second user to allow the second user, after the first user, to login and be assigned the screen to input information into the screen, while maintaining a login status of the first user, wherein the login processing unit is configured to allow the first and second users who are logged-in users to switch between a front user status and a back user status, such that a logged-in user given the front user status is allowed to input information into the screen while a logged-in user given the back user status is not allowed to input information into the screen, wherein after the first user logs in and is assigned to the front user status input information into the screen, the information processing apparatus performs a job of the first user, which job of the first user is a job executed by application software, and wherein the login processing unit further detects completion of a job of the first user executed by application software, and upon detecting the completion of the job of the first user executed by application software automatically changes the screen into a screen allowing the first user to logout or to change a status of the first user to the back user status to not be assigned to input information into the screen, and automatically without user intervention switches to a logon screen waiting for input of authentication information.

4. An information processing method, performed by an information processing apparatus which accepts an operating instruction from a user who has logged into the information processing apparatus and is assigned to input information into a display screen on the information processing apparatus, said method comprising:

a login processing allowing multi-user logins of at least first and second users, and to allow the first user to login and be assigned the screen to input information into the screen, and allowing a switchover of assigning the screen to the second user to allow the second user, after the first user, to login and be assigned the screen to input information into the screen, while maintaining a login status of the first user, wherein the login processing allows the first and second users who are logged-in users to switch between a front user status and a back user status, such that a logged-in user given the front user status is allowed to input information into the screen while a logged-in user given the back user status is not allowed to input information into the screen, wherein after the first user logs in and is assigned the front user status to input information into the screen, the information processing apparatus performs a job of the first user, which job of the first user is a job executed by application software, and wherein the login processing further detects completion of a job of the first user executed by application software, and upon detecting the completion of the job of the first user executed by application software automatically changes a status of the first user to the back user status to not be assigned to input information into the screen, and automatically without user intervention changes the screen into a logon state screen waiting for input of authentication information.

5. An information processing method, performed by an information processing apparatus which accepts an operating instruction from a user who has logged into the information processing apparatus and is assigned to input information into a display screen on the information processing apparatus, said method comprising:

a login processing allowing multi-user logins of at least first and second users, and to allow the first user to login and be assigned the screen to input information into the screen, and allowing a switchover of assigning the screen to the second user to allow the second user, after the first user, to login and be assigned the screen to input information into the screen, while maintaining a login status of the first user;

wherein the login processing allows the first and second users who are logged-in users to switch between a front user status and a back user status, such that a logged-in user given the front user status is allowed to input information into the screen while a logged-in user given the back user status is not allowed to input information into the screen, wherein after the first user logs in and is assigned the front user status to input information into the screen, the information processing apparatus performs a job of the first user, which job of the first user is a job executed by application software, and wherein the login processing further detects completion of a job of the first user executed by application software, and upon detecting the completion of the job of the first user executed by application software automatically changes the screen into a screen allowing the first user to select performing another job or to change a status of the first user to the back user status to not be assigned to input information into the screen, and automatically without user intervention switches to a logon state screen waiting for input of authentication information.

6. An information processing method, performed by an information processing apparatus which accepts an operating instruction from a user who has logged into the information processing apparatus and is assigned to input information into a display screen on the information processing apparatus, said method comprising:

a login processing allowing multi-user logins of at least first and second users, and to allow the first user to login and be assigned the screen to input information into the screen, and allowing a switchover of assigning the screen to the second user to allow the second user, after the first user, to login and be assigned the screen to input information into the screen, while maintaining a login status of the first user, wherein the login processing allows the first and second users who are logged-in users to switch between a front user status and a back user status, such that a logged-in user given the front user status is allowed to input information into the screen while a logged-in user given the back user status is not allowed to input information into the screen, wherein after the first user logs in and is assigned the front user status to input information into the screen, the information processing apparatus performs a job of the first user, which job of the first user is a job executed by application software, and wherein the login processing further detects completion of a job of the first user executed by application software, and upon detecting the completion of the job of the first user executed by application software automatically changes the screen into a screen allowing the first user to logout or to change a status of the first user to the back user status to not be assigned to input information into the screen, and automatically without user intervention switches to a logon screen waiting for input of authentication information.

7. A non-transitory computer-readable medium, having a program embodied therein for causing a computer to serve as an information processing apparatus which accepts an operating instruction from a user who has logged into the information processing apparatus and is assigned to input information into a display screen on the information processing apparatus, said computer-readable medium comprising:

first computer executable code to execute a login processing to allow multi-user logins of at least first and second users, and to allow the first user to login and be assigned the screen to input information into the screen and to allow a switchover of assigning the screen to the second user to allow the second user, after the first user, to login and be assigned the screen to input information into the screen, while maintaining a login status of the first user, wherein the login processing allows the first and second users who are logged-in users to switch between a front user status and a back user status, such that a logged-in user given the front user status is allowed to input information into the screen while a logged-in user given the back user status is not allowed to input information into the screen, wherein after the first user logs in and is assigned the front user status to input information into the screen, the information processing apparatus performs a job of the first user, which job of the first user is a job executed by application software, and wherein the login processing further detects completion of a job of the first user executed by application software, and upon detecting the completion of the job of the first user executed by application software automatically changes a status of the first user to the back user status to not be assigned to input information into the screen, and automatically without user intervention changes the screen into a logon state screen waiting for input of authentication information.

8. A non-transitory computer-readable medium, having a program embodied therein for causing a computer to serve as an information processing apparatus which accepts an operating instruction from a user who has logged into the information processing apparatus and is assigned to input information into a display screen on the information processing apparatus, said computer-readable medium comprising:

first computer executable code to execute a login processing to allow multi-user logins of at least first and second users, and to allow the first user to login and be assigned the screen to input information into the screen and to allow a switchover of assigning the screen to the second user to allow the second user, after the first user, to login and be assigned the screen to input information into the screen, while maintaining a login status of the first user, wherein the login processing allows the first and second users who are logged-in users to switch between a front user status and a back user status, such that a logged-in user given the front user status is allowed to input information into the screen while a logged-in user given the back user status is not allowed to input information into the screen, wherein after the first user logs in and is assigned the front user status to input information into the screen, the information processing apparatus performs a job of the first user, which job of the first user is a job executed by application software, and wherein the login processing further detects completion of a job of the first user executed by application software, and upon detecting the completion of the job of the first user executed by application software automatically changes the screen into a screen allowing the first user to select performing another job or to change a status of the first user to the back user status to not be assigned to input information into the screen, and automatically without user intervention switches to a logon state screen waiting for input of authentication information.

9. A non-transitory computer-readable medium, having a program embodied therein for causing a computer to serve as an information processing apparatus which accepts an operating instruction from a user who has logged into the information processing apparatus and is assigned to input information into a display screen on the information processing apparatus, said computer-readable medium comprising:

first computer executable code to execute a login processing to allow multi-user logins of at least first and second users, and to allow the first user to login and be assigned the screen to input information into the screen and to allow a switchover of assigning the screen to the second user to allow the second user, after the first user, to login and be assigned the screen to input information into the screen, while maintaining a login status of the first user, wherein the login processing allows the first and second users who are logged-in users to switch between a front user status and a back user status, such that a logged-in user given the front user status is allowed to input information into the screen while a logged-in user given the back user status is not allowed to input information into the screen, wherein after the first user logs in and is assigned the front user status to input information into the screen, the information processing apparatus performs a job of the first user, which job of the first user is a job executed by application software, and wherein the login processing further detects completion of a job of the first user executed by application software, and upon detecting the completion of the job of the first user executed by application software automatically changes the screen into a screen allowing the first user to logout or to change a status of the first user to the back user status to not be assigned to input information into the screen, and automatically without user intervention switches to a logon screen waiting for input of authentication information.

* * * * *